(12) United States Patent
Nakano et al.

(10) Patent No.: US 11,893,195 B2
(45) Date of Patent: Feb. 6, 2024

(54) DETECTION DEVICE

(71) Applicant: Japan Display Inc., Tokyo (JP)

(72) Inventors: Fumihoru Nakano, Tokyo (JP); Hiroshi Yamaguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/954,636

(22) Filed: Sep. 28, 2022

(65) Prior Publication Data
US 2023/0107028 A1  Apr. 6, 2023

(30) Foreign Application Priority Data
Oct. 5, 2021 (JP) .................. 2021-164277

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0445* (2019.05); *G06F 2203/04107* (2013.01); *G06F 2203/04111* (2013.01)

(58) Field of Classification Search
CPC ... G06F 2203/04107; G06F 3/041–047; G06F 2203/041–04114; G06F 3/04164; G06F 3/04182; H10K 59/40; H10K 59/00–95
See application file for complete search history.

(56) References Cited

U.S. PATENT DOCUMENTS

2019/0146610 A1   5/2019  Teranishi
2019/0302959 A1* 10/2019  Clark ................. G06F 3/044

FOREIGN PATENT DOCUMENTS

| JP | 2019-091401 A | 6/2019 | |
|---|---|---|---|
| JP | 2020-166656 A | 10/2020 | |
| KR | 101859469 B1 * | 5/2018 | ......... G06F 3/041 |
| KR | 20190080563 A * | 7/2019 | ......... G06F 3/041 |

* cited by examiner

*Primary Examiner* — Sanjiv D. Patel
(74) *Attorney, Agent, or Firm* — K&L Gates LLP

(57) ABSTRACT

A detection device includes a shield layer provided with a shield electrode and a shield electrode connection wiring connected to the shield electrode, and a sensor layer located over the shield layer and provided with a sensor electrode and a sensor electrode connection wiring connected to the sensor electrode. The shield electrode has the same planar pattern as the sensor electrode and overlaps the sensor electrode. The shield electrode connection wiring has the same planar pattern as the sensor electrode connection wiring and overlaps the sensor electrode connection wiring.

5 Claims, 15 Drawing Sheets

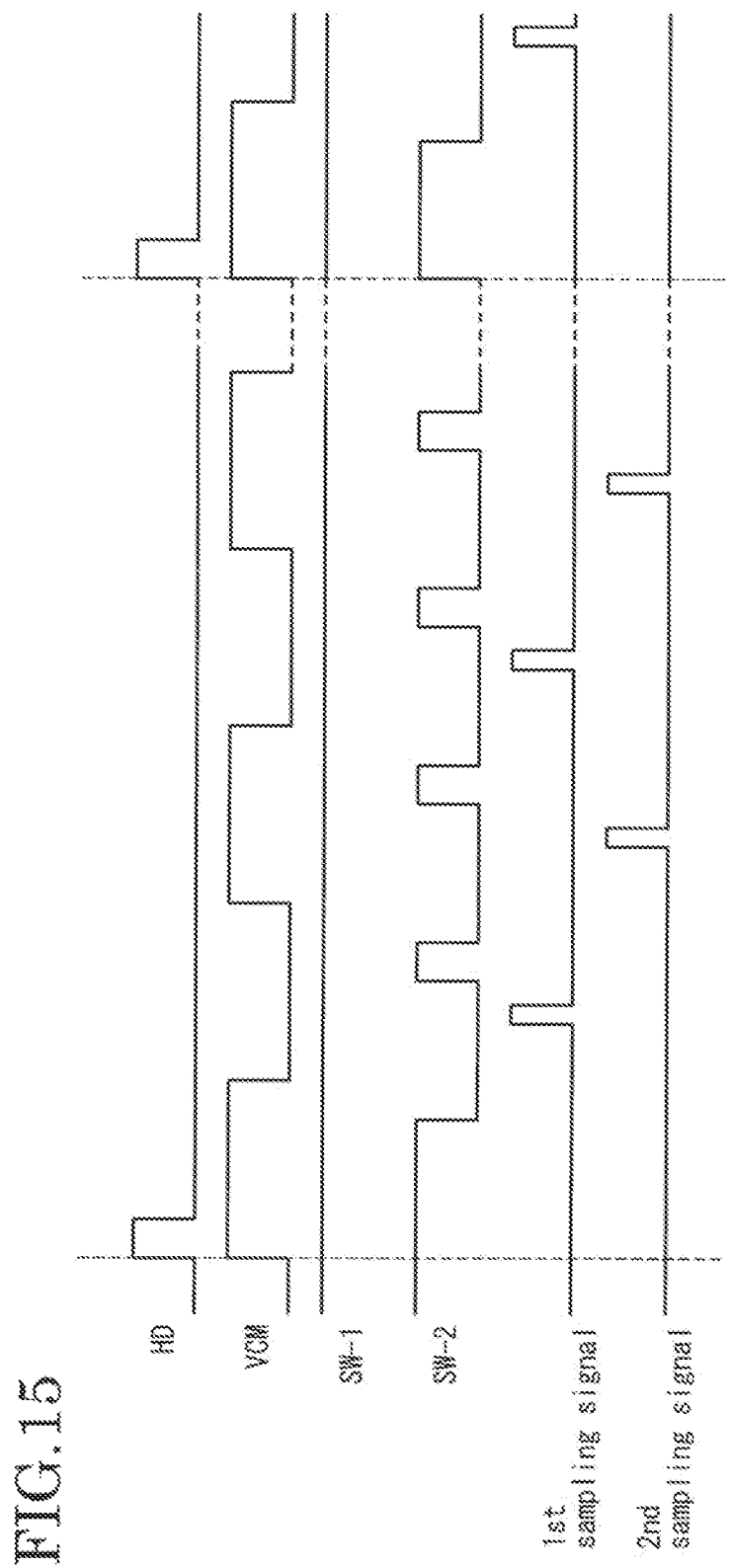

DETECTION DEVICE

CROSS-REFERENCE TO RELATED APPLICATIONS

This application claims the benefit of priority to Japanese Patent Application No. 2021-164277, filed on Oct. 5, 2021, the entire contents of which are incorporated herein by reference.

FIELD

One embodiment of the present invention relates to a detection device that detects contact or proximity of an object to be detected.

BACKGROUND

An information terminal such as a smart phone or a tablet is equipped with a touch panel as a user interface. In the touch panel, a display module using liquid crystals or an OLED is provided with a detection device for detecting contact or the proximity of an object to be detected such as a finger or a stylus pen. Although a resistive film method or an electrostatic capacitance method is known as a detection method of the detection device, the electrostatic capacitance method, particularly a self-capacitance method, is adopted when detecting an object to be detected in proximity. (For example, see Japanese Patent Application Laid-Open Publication Nos. 2019-91401 and 2020-166656).

SUMMARY

A detection device includes a shield layer provided with a shield electrode and a shield electrode connection wiring connected to the shield electrode, and a sensor layer located over the shield layer and provided with a sensor electrode and a sensor electrode connection wiring connected to the sensor electrode. The shield electrode has the same planar pattern as the sensor electrode and overlaps the sensor electrode. The shield electrode connection wiring has the same planar pattern as the sensor electrode connection wiring and overlaps the sensor electrode connection wiring.

BRIEF DESCRIPTION OF DRAWINGS

FIG. 15 is a timing chart showing driving of a detection circuit that performs double-sided detection in a display device according to an embodiment of the present invention.

DESCRIPTION OF EMBODIMENTS

Figure 1:
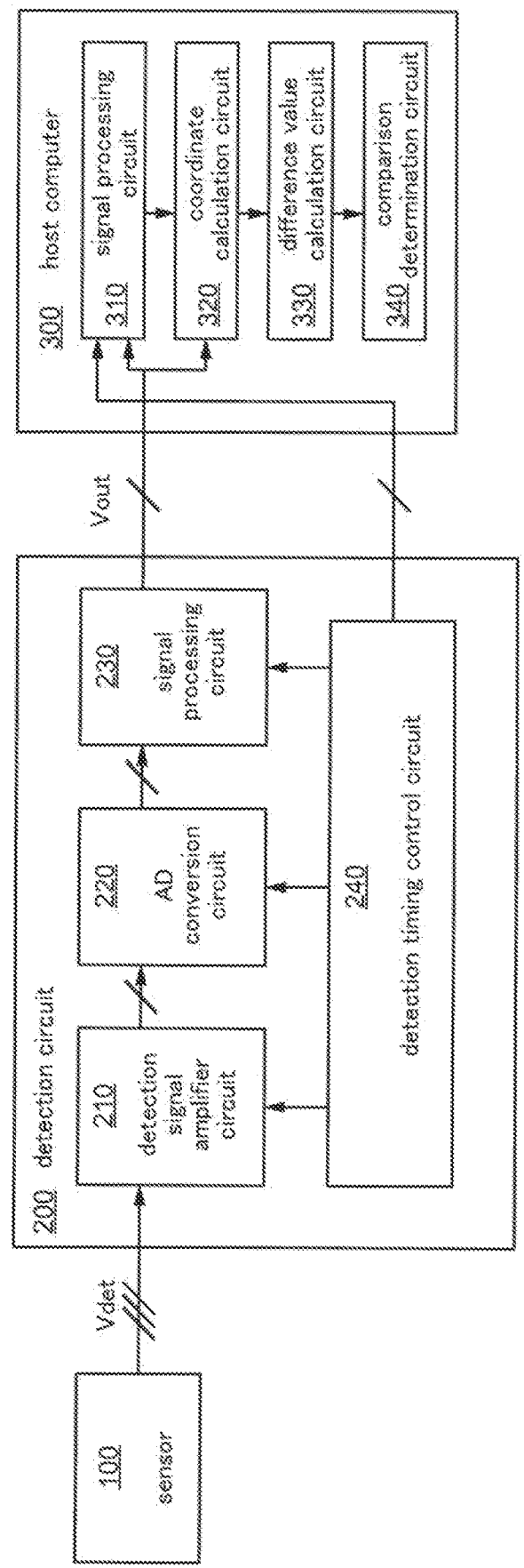
FIG. 1 is a block diagram showing a configuration of a detection device according to an embodiment of the present invention.

In a self-capacitance touch panel, a shield electrode is provided on a surface (non-detection surface) opposite to a surface (detection surface) on which a sensor electrode for detecting an object to be detected is provided. The shield electrode is formed on the entire surface of the non-detection surface in order to suppress the influence from the non-detection surface. Further, since the shield electrode is provided, there is a capacitance between the sensor electrode and the shield electrode. A so-called active shielding, in which the shield electrode and the sensor electrode are operated in the same phase, suppresses the occurrence of the capacitance as much as possible. However, when the resistance of the shield electrode is not sufficiently low, variations in the resistance of the shield electrode within the surface and differences in the distance to a power supply circuit that supplies the potential to the shield electrode cause a difference in the capacitance of the sensor electrode, resulting in the occurrence of in-plane variation in a detection signal output from the sensor electrode. In particular, in a sensor such as a hover sensor that is required to detect coordinates in the height direction, such variation in baseline capacitance is a problem that cannot be ignored.

In view of the above problem, one object of an embodiment of the present invention is to provide a detection device with improved positional accuracy of an object to be detected.

Hereinafter, embodiments of the present invention are described with reference to the drawings. Each of the embodiments is merely an example, and a person skilled in the art could easily conceive of the invention by appropriately changing the embodiment while maintaining the gist of the invention, and such changes are naturally included in the scope of the invention. For the sake of clarity of the description, the drawings may be schematically represented with respect to the widths, thicknesses, shapes, and the like of the respective portions in comparison with actual embodiments. However, the illustrated shapes are merely examples and are not intended to limit the interpretation of the present invention. In the specification and the drawings, the same reference numerals are provided to the same elements as those described previously with reference to preceding figures and repeated explanations may be omitted accordingly.

In the specification, the expressions "α includes A, B or C", "α includes any of A, B and C", and "α includes one selected from the group consisting of A, B and C" do not exclude the case where α includes a plurality of combinations of A to C unless otherwise specified. Further, these expressions do not exclude the case where α includes other elements.

In the specification, terms such as "first", "second", or "third" attached to each configuration are convenient marks used to distinguish each configuration, and have no further meaning unless otherwise explained.

The following embodiments can be combined with each other as long as there is no technical contradiction.

First Embodiment

[1. Overview of Configuration of Detection Device 10]

An overview of a configuration of a detection device 10 according to an embodiment of the present invention is described with reference to FIGS. 1 and 2.

Figure 2:
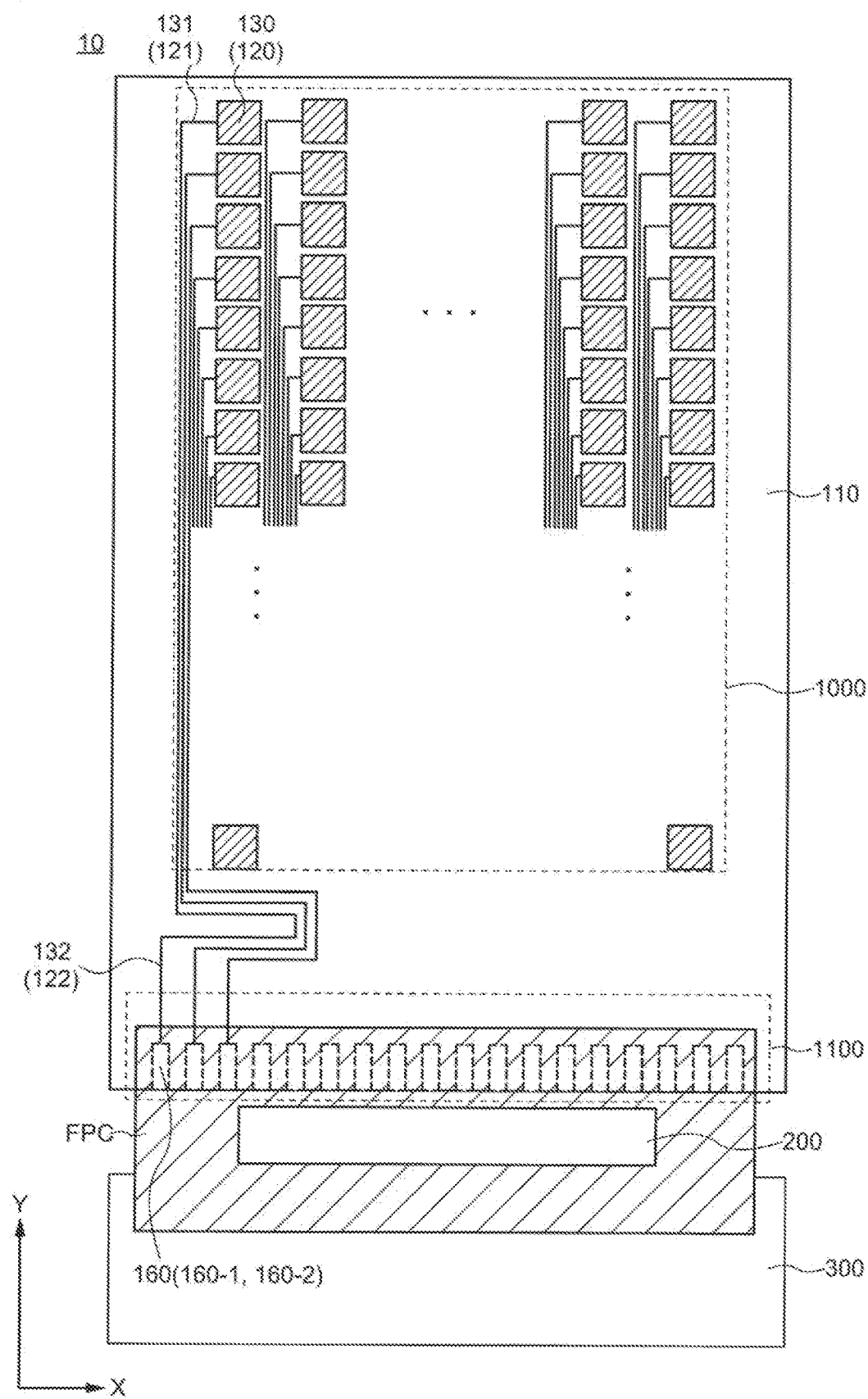
FIG. 2 is a schematic plan view showing a configuration of a detection device according to one embodiment of the present invention.

FIG. 1 is a block diagram showing a configuration of the detection device 10 according to an embodiment of the invention. Further, FIG. 2 is a schematic plan view showing a configuration of the detection device 10 according to an embodiment of the present invention. As shown in FIGS. 1 and 2, the detection device 10 includes a sensor 100, a detection circuit 200, and a host computer 300. The sensor 100 is electrically connected to the detection circuit 200, and the detection circuit 200 is connected to the host computer 300. Further, the detection circuit 200 is provided on a flexible printed circuit substrate FPC.

The sensor 100 includes a sensor portion 1000 provided with a plurality of sensor electrodes 130 over a substrate 110 and a terminal portion 1100 provided with a plurality of terminals 160 over the substrate 110. The plurality of sensor electrodes 130 is arranged in a matrix in an X direction and in a Y direction perpendicular to (intersecting) the X direction. In the sensor portion 1000, a sensor electrode connection wiring 131 is connected to each of the plurality of sensor electrodes 130. A sensor layer wiring 132 is a wiring extending from a sensor electrode connection wiring 131 of the sensor portion 1000 and is connected to a terminal 160. That is, the sensor electrode 130 is connected to the terminal 160 via the sensor electrode connection wiring 131 inside the sensor portion 1000 and the sensor layer wiring 132 outside the sensor portion 1000. The wiring length from the sensor electrode 130 to the terminal 160 (the total length of the sensor electrode connection wiring 131 and the sensor layer wiring 132) varies depending on the position where the sensor electrode 130 is provided. Therefore, in the sensor 100, the lengths of the sensor layer wirings 132 are adjusted so that the wiring lengths of the sensor electrodes 130 are the same.

The sensor 100 is a hover sensor that detects the coordinates of an object to be detected in a non-contact state with the sensor portion 1000 based on the detection of the object to be detected by a self-capacitance method. The coordinates include not only the X coordinate and the Y coordinate (planar coordinates) in the sensor portion 1000 but also the Z coordinate in the height direction with respect to the sensor portion 1000. That is, the sensor 100 can detect X, Y, and Z coordinates. A touch sensor that detects the plane coordinates of an object to be detected in contact with the sensor portion 1000, or a sensor that functions as both the hover sensor and the touch sensor can also be adopted as the sensor 100. Also, the object to be detected may be not only a user's fingers but also other body parts such as a palm and a toe.

The sensor 100 outputs a detection signal Vdet from the terminal portion 1100. Further, although details are described later, the sensor 100 includes a plurality of shield electrodes 120 that overlap the plurality of sensor electrodes 130. Similar to the sensor electrode 130, the shield electrode 120 is also connected to the terminal 160. Therefore, the terminal portion 1100 outputs the detection signal Vdet from each of the sensor electrode 130 and the shield electrode 120. For example, the detection signal Vdet from the sensor electrode 130 is output from one side (left side) of the terminal portion 1100, and the detection signal Vdet from the shield electrode 120 is output from the other side (right side) of the terminal portion 1100. That is, the terminal portion 1100 is provided with a first terminal 160-1 and a second terminal 160-2 electrically connected to the sensor electrode 130 and the shield electrode 120, respectively. In the following description, for convenience of explanation, in order to distinguish between the detection signal Vdet from the sensor electrode 130 and the detection signal Vdet from the shield electrode 120, the detection signal Vdet from the sensor electrode 130 is referred to as the first detection signal Vdet-1, and the detection signal Vdet from the shield electrode 120 is referred to as the second detection signal Vdet-2.

The detection circuit 200 amplifies the detection signal Vdet (the first detection signal Vdet-1 and the second detection signal Vdet-2) output from the sensor 100 and converts it into a digital signal (see FIG. 3 described later). The detection circuit 200 includes a detection signal amplification circuit 210, an AD conversion circuit 220, a signal processing circuit 230, and a detection timing control circuit 240. The detection timing control circuit 240 controls the detection signal amplifier circuit 210, the AD conversion circuit 220, and the signal processing circuit 230 so that they operate synchronously. Although details are described later, the detection signal amplifier circuit 210 outputs an analog signal obtained by amplifying the detection signal Vdet. The AD conversion circuit 220 converts the analog signal output from the detection signal amplification circuit 210 into a digital signal. The signal processing circuit 230 includes, for example, a digital signal processor (DSP) and memory, etc., performs arithmetic processing on the digital signal converted by the AD conversion circuit 220, and outputs a digital output signal Vout. The digital output signal Vout is input to the host computer 300. Note that the digital output signal Vout may be called raw data.

The host computer 300 includes a signal processing circuit 310, a coordinate calculation circuit 320, a difference value calculation circuit 330, and a comparison determination circuit 340. The host computer 300 can calculate a position of the object to be detected using the digital output signal Vout or determine the presence or absence of the object to be detected. Although the first digital output signal Vout-1 converted from the first detection signal Vdet-1 by the detection circuit 200 is used for detection (positional calculation) of the object to be detected, the second digital output signal Vout-2 converted from the detection signal Vdet-2 is not used for detection of the object to be detected.

The detection circuit 200 and the host computer 300 may be integrated into one IC chip and provided on a flexible substrate.

[2. Detection of Object to be Detected in Detection Device 10]

The detection of an object to be detected in the detection device 10 according to an embodiment of the present invention is described with reference to FIGS. 3 and 4.

Figure 3:
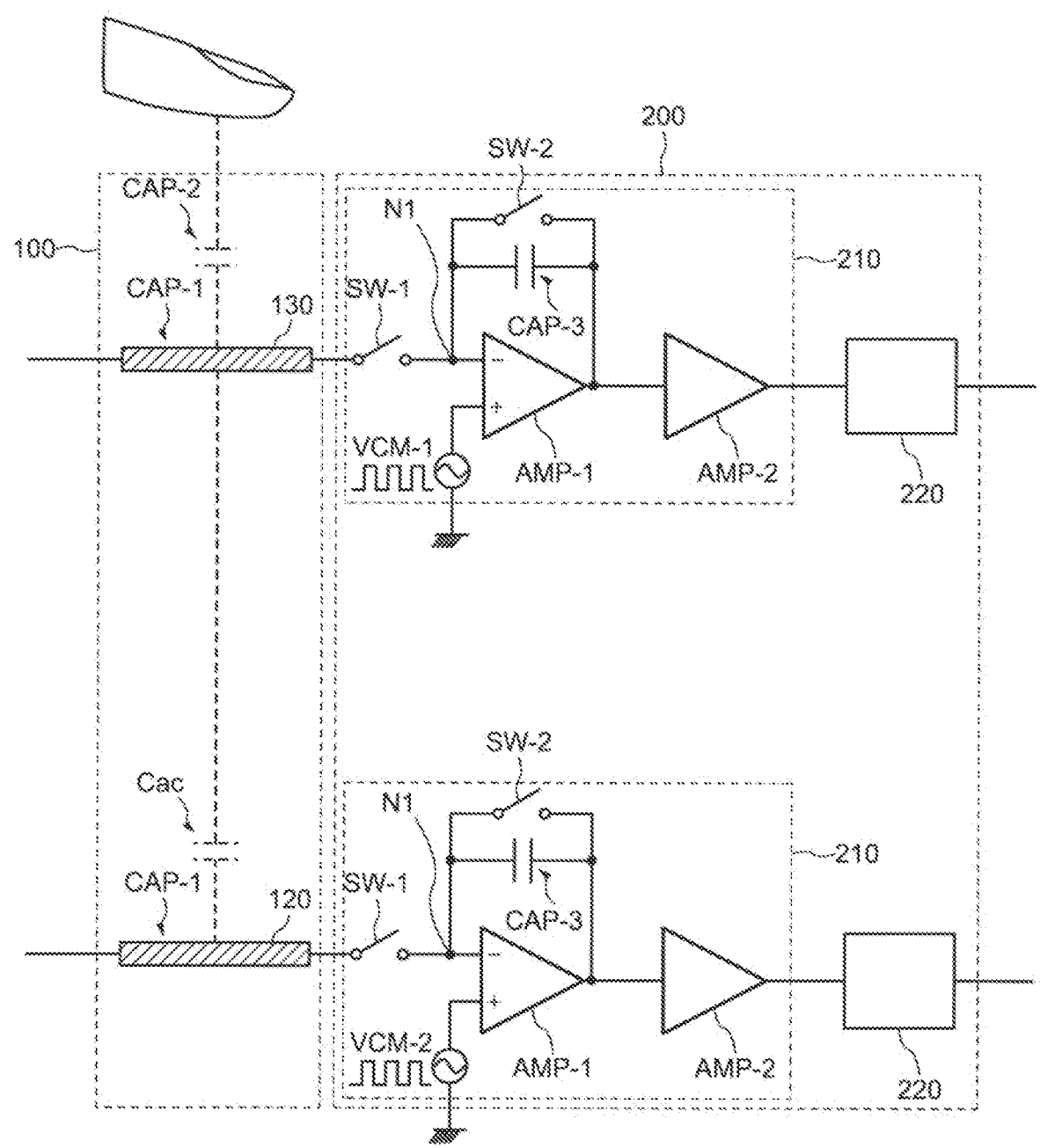
FIG. 3 is a schematic diagram for illustrating detection of an object to be detected by a self-capacitance method in a detection device according to an embodiment of the present invention.

FIG. 3 is a schematic diagram illustrating detection of an object to be detected by a self-capacitance method in the detection device 10 according to an embodiment of the present invention. FIG. 4 is a timing chart showing driving of the detection circuit 200 in the detection device 10 according to an embodiment of the present invention. Although FIG. 3 shows a case where the object to be detected is a finger, the object to be detected is not limited to this. For example, the object to be detected may be an object including a conductor such as a stylus pen.

As shown in FIG. 3, the sensor 100 includes the sensor electrode 130 having a self-capacitance CAP-1. When there is no finger on the sensor electrode 130, a current corresponding to the self-capacitance CAP-1 (a baseline current) flows through the sensor electrode 130. Thus, when the object to be detected does not exist on the sensor portion 1000, in each of the sensor electrodes 130, the capacitance that is inevitably formed by the relationship with the surrounding other sensor electrodes 130 or the shield electrode 120 is called a baseline capacitance. On the other hand, when the finger is present on the sensor electrode 130, a capacitance CAP-2 is formed between the finger and the sensor electrode 130. In this case, a current corresponding to the self-capacitance CAP-1 and the capacitance CAP-2 flows through the sensor electrode 130. Therefore, the sensor electrode 130 of the sensor 100 outputs the first detection signal Vdet-1 corresponding to the self-capacitance CAP-1 or the self-capacitance CAP-1 and the capacitance CAP-2. Note that the capacitance CAP-2 is determined by the distance between the sensor electrode 130 and the finger, and has a different value for each sensor electrode 130.

The shield electrode 120 is provided so as to overlap the sensor electrode 130, and a parasitic capacitance Cac exists between the shield electrode 120 and the sensor electrode 130. However, since the shield electrode 120 and the sensor electrode 130 are separated by a sufficient distance, the parasitic capacitance Cac is small enough to be ignored. Therefore, similar to the sensor electrode 130, the shield electrode 120 of the sensor 100 outputs the second detection signal Vdet-2 corresponding to the self-capacitance CAP-1 or the self-capacitance CAP-1 and the capacitance CAP-2.

The detection circuit 200 includes the detection signal amplification circuit 210 connected to each of the sensor electrode 130 and the shield electrode 120 and the AD conversion circuit 220. The detection signal amplification circuit 210 includes a first amplification circuit AMP-1, a first switch SW-1, a second switch SW-2, a feedback capacitor CAP-3, and a second amplification circuit AMP-2. The first switch SW-1 is connected to an inverting input terminal of the first amplification circuit AMP-1. The second switch SW-2 and the feedback capacitor CAP-3 are connected in parallel to the inverting input terminal and an output terminal of the first amplification circuit AMP-1. The second amplification circuit AMP-2 is connected to the output terminal of the first amplifier circuit AMP-1. The second amplification circuit AMP-2 is a so-called gain amplification circuit that further amplifies the signal amplified by the first amplification circuit AMP-1. The second amplification circuit AMP-2 can be provided as appropriate.

The first detection signal Vdet-1 output from the sensor 100 passes through a node N1 between the inverting input terminal of the first amplification circuit AMP-1 and the first switch SW-1 through the switch SW-1 in a turn-on state. Further, an AC rectangular wave VCM is input to a non-inverting input terminal of the first amplification circuit AMP-1. Therefore, when the second switch SW-2 is in a turn-off state, an analog signal with a AC rectangular wave corresponding to the first detection signal Vdet-1 is output from the output terminal of the first amplification circuit AMP-1. On the other hand, when the second switch SW-2 is in a turn-off state, the inverting input terminal and the output terminal of the first amplification circuit AMP-1 are electrically connected to each other (that is, the inverting input terminal and the output terminal of the first amplification circuit AMP-1 have the same potential), thus, the first amplification circuit AMP-1 is reset. Therefore, the second switch SW-2 may be called a reset switch.

Figure 4:
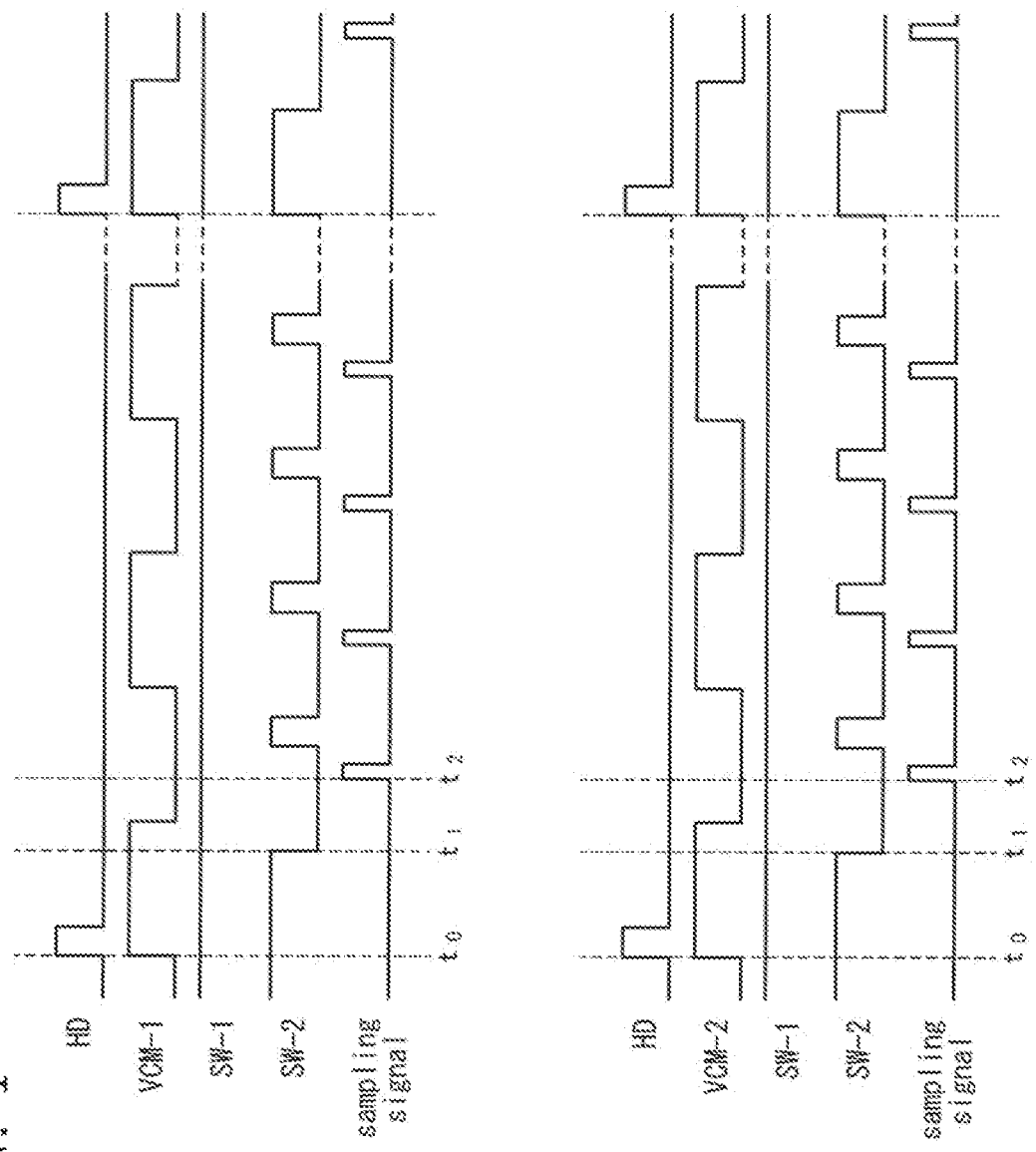
FIG. 4 is a timing chart showing driving of a detection circuit in a detection device according to an embodiment of the present invention.

Further, referring to the timing chart shown in FIG. 4, at time $t_0$, a first AC rectangular wave VCM-1 is input to the non-inverting input terminal of the first amplification circuit AMP-1 in accordance with a synchronization signal HD from the detection timing control circuit 240. At this time, each of the first switch SW-1 and the second switch SW-2 is in a turn-on state. Since not only the first switch SW-1 but also the second switch is in the turn-on state, the first amplification circuit AMP-1 is reset.

Next, at time $t_1$, the second switch SW-2 is turned off. Thus, an analog signal with an AC rectangular wave corresponding to the first detection signal Vdet-1 is output from the output terminal of the first amplification circuit AMP-1.

Next, at time $t_2$, when a sampling signal is output from the host computer 300 to the detection circuit 200, the detection circuit 200 outputs a first digital output signal Vout-1 which is converted from the analog signal with an AC rectangular wave by the AD conversion circuit 220. Note that the sampling signal from the host computer 300 may be input to the AD conversion circuit 220 or may be input to the signal processing circuit 230.

Then, the turn-on and the turn-off of the second switch SW-2 and the input of the sampling signal are repeated, and the detection circuit 200 outputs the first digital output signal Vout-1 each time the sampling signal is input.

The host computer 300 uses the first digital output signal Vout-1 to calculate the position of the detected object. Specifically, the host computer 300 calculates the position of the object to be detected, based on the potential difference between the first digital output signal Vout-1 when the object to be detected does not exist and the first digital output signal Vout-1 when the object to be detected exists.

By the above processing, the detecting device 10 can detect the object to be detected. Although details are described later, the second detection signal Vdet-2 output from the shield electrode 120 is also input to the detection circuit 200, and the second AC rectangular wave VCM-2 is input to the non-inverting input terminal of the first amplification circuit AMP-1 to perform the same processing as above. However, although the second digital output signal Vout-2 into which the second detection signal Vdet-2 output from the detection circuit 200 is digitally converted may be input to the host computer 300, the second digital output signal Vout-2 is not used to calculate the position of the object to be detected.

Note that, hereinafter, the first digital output signal Vout-1 when there is no object to be detected may be referred to as a baseline.

[3. Configuration of Sensor 100]

A configuration of the sensor 100 of the detection device 10 according to an embodiment of the present invention is described with reference to FIGS. 5 to 7.

Figure 5:
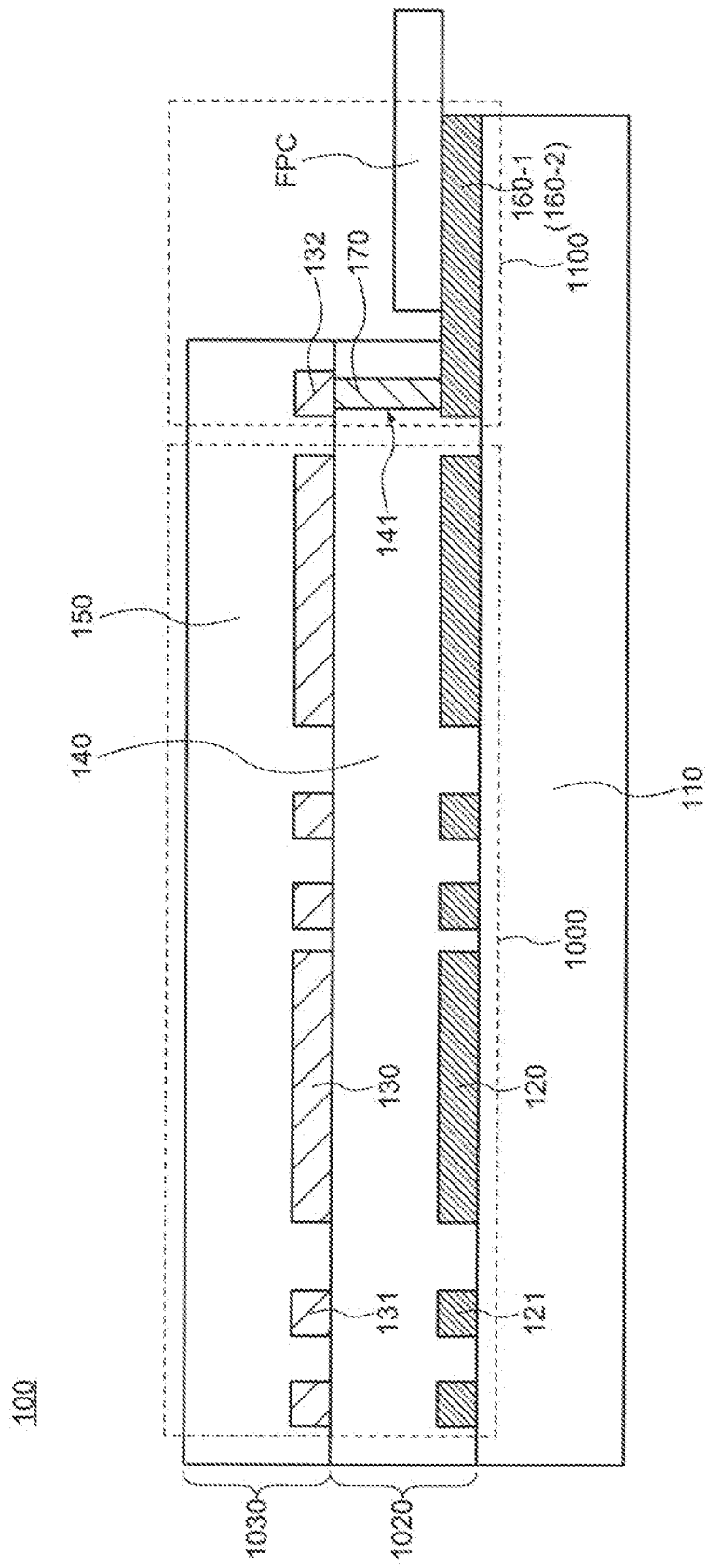
FIG. 5 is a schematic cross-sectional view showing a configuration of a sensor of the detection device according to an embodiment of the present invention.

FIG. 5 is a schematic cross-sectional view showing a configuration of the sensor 100 of the detection device 10 according to an embodiment of the invention. Further, FIG. 6 is a schematic plan view showing a configuration of the sensor portion 1000 of the sensor 100 of the detection device 10 according to an embodiment of the present invention. Furthermore, FIG. 7 is a schematic plan view showing a configuration of the terminal portion 1100 of the sensor 100 of the detection device 10 according to an embodiment of the present invention.

As shown in FIG. 5, the sensor 100 includes the substrate 110, a shield layer 1020, and a sensor layer 1030. The shield layer 1020 is provided over the substrate 110. The sensor layer 1030 is provided over the shield layer 1020.

The shield layer 1020 includes the plurality of shield electrodes 120, a plurality of shield electrode connection wirings 121, a first insulating film 140, the plurality of first terminals 160-1, and the plurality of second terminals 160-2. The plurality of shield electrodes 120, the plurality of shield electrode connection wirings 121, the plurality of first terminals 160-1, and the plurality of second terminals 160-2 are formed of the same layer and covered with the first insulating film 140. The plurality of shield electrodes 120 and the plurality of shield electrode connection wirings 121 are provided in the sensor portion 1000, and the plurality of first terminals 160-1 and the plurality of second terminals 160-2 are provided in the terminal portion 1100 (See FIG. 2). Since each of the plurality of first terminals 160-1 and the plurality of second terminals 160-2 is connected to the flexible printed circuit substrate FPC, a part of each of the plurality of first terminals 160-1 and the plurality of second terminals 160-2 has a region exposed from the first insulating film 140.

The sensor layer 1030 includes the plurality of sensor electrodes 130, the plurality of sensor electrode connection wirings 131, and a second insulating film 150. The plurality of sensor electrodes 130 and the plurality of sensor electrode connection wirings 131 are formed of the same layer and covered with the second insulating film 150. The plurality of sensor electrodes 130 and the plurality of sensor electrode connection wirings 131 are provided in the sensor portion 1000.

Figure 6:
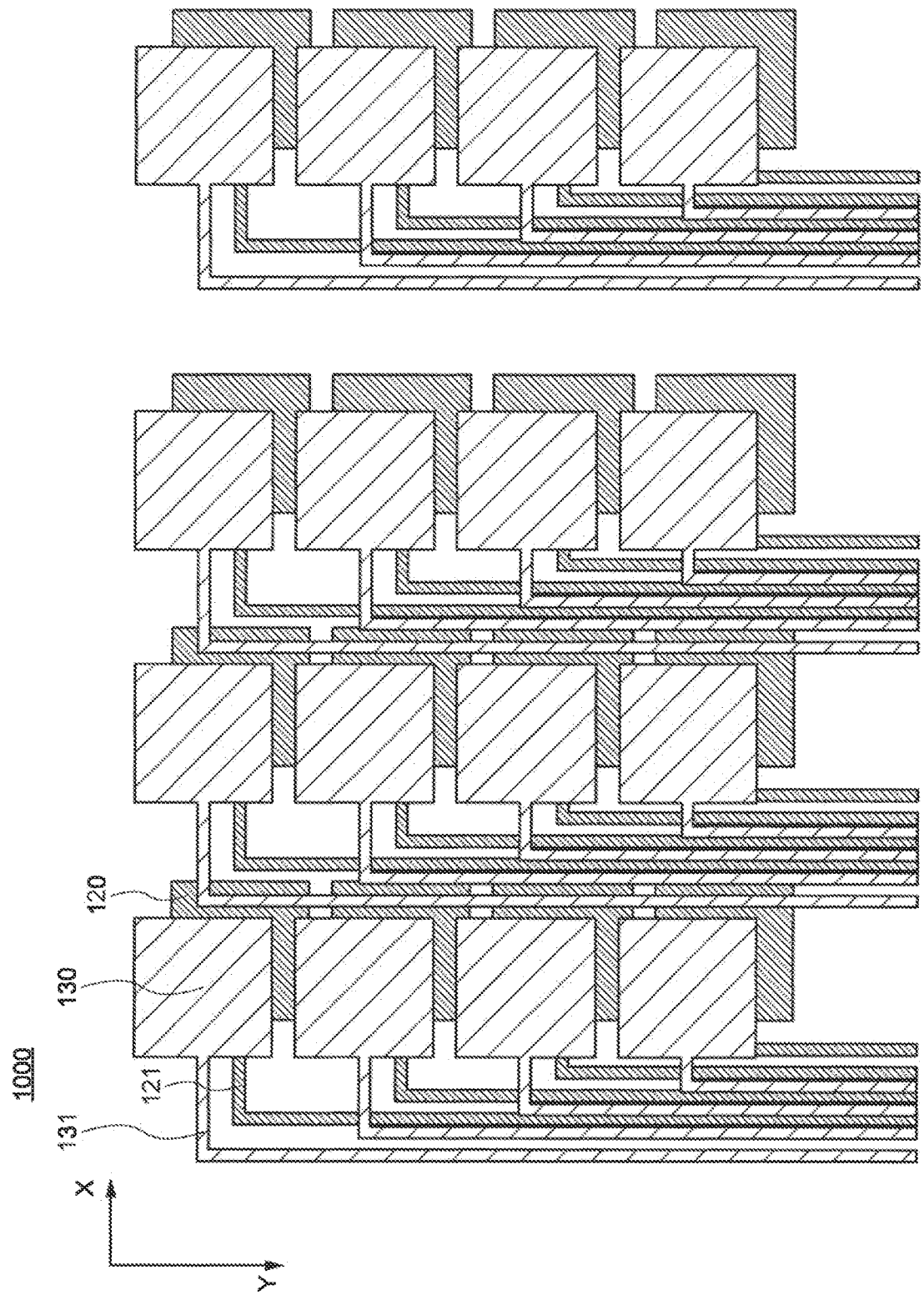
FIG. 6 is a schematic plan view showing a configuration of a sensor portion of a sensor of a detection device according to an embodiment of the present invention.

As shown in FIG. 6, in the sensor portion 1000, the plurality of sensor electrodes 130 has the same planar pattern as the plurality of shield electrodes 120. In other words, the planar pattern of each of the plurality of sensor electrodes 130 is the same as the planar pattern of each of the plurality of shield electrodes 120. Although FIG. 6 shows that the sensor electrodes 130 are shifted from the shield electrodes 120 for convenience of explanation, the planar pattern of the plurality of sensor electrodes 130 matches the planar pattern of the plurality of shield electrodes 120 in a plan view. That is, the plurality of sensor electrodes 130 overlaps the plurality of shield electrodes 120 such that the planar pattern of the plurality of sensor electrodes 130 matches the planar pattern of the plurality of shield electrodes 120.

Note that two overlapping planar patterns substantially matching each other means that in a plan view, the two planar patterns overlap each other exactly without any deviation, or the two planar patterns overlap each other with a variation within 10% in the X direction and the Y direction. In the latter case, it can be said that the two planar patterns substantially match each other. In the specification, for convenience of explanation, the term "match" includes "match" and "substantially match".

In the sensor portion 1000, the shield electrode connection wiring 121 and the sensor electrode connection wiring 131 are connected to the shield electrode 120 and the sensor electrode 130, respectively. The plurality of sensor electrode connection wires 131 has the same planar pattern as the plurality of shield electrode connection wires 121. Therefore, the plurality of sensor electrode connection wirings 131 overlaps the plurality of shield electrode connection wirings 121 so that the planar pattern of the plurality of sensor electrode connection wirings 131 matches the planar pattern of the plurality of shield electrode connection wirings 121. More specifically, one sensor electrode 130 overlaps one shield electrode 120 so that the planar pattern of the one sensor electrode 130 matches the planar pattern of the one shield electrode 120, and the sensor electrode connection wiring 131 connected to the one sensor electrode 130 overlaps the shield electrode connection wiring 121 connected to the one shield electrode 120 so that the planar pattern of the sensor electrode connection wiring 131 matches the planar pattern of the shield electrode connection wiring 121.

Although FIG. 6 shows that each of the shield electrode 120 and the sensor electrode 130 has a rectangular planar pattern, the planar pattern shape of each of the shield electrode 120 and the sensor electrode 130 is not limited to this configuration. In the sensor 100, the shield electrode 120 and the sensor electrode 130 have the same planar pattern, and the planar pattern shape may be circular, elliptical, or polygonal. Further, although the shield electrode connection wiring 121 is connected to one side of the shield electrode 120, the connection position is not limited to this configuration. The shield electrode connection wiring 121 may be connected to one corner of the planar pattern of the shield electrode 120. In this case, the sensor electrode connection wiring 131 is connected to one corner of the planar pattern of the sensor electrode 130 so that the shield electrode connection wiring 121 and the sensor electrode connection wiring 131 have the same planar pattern.

Figure 7:
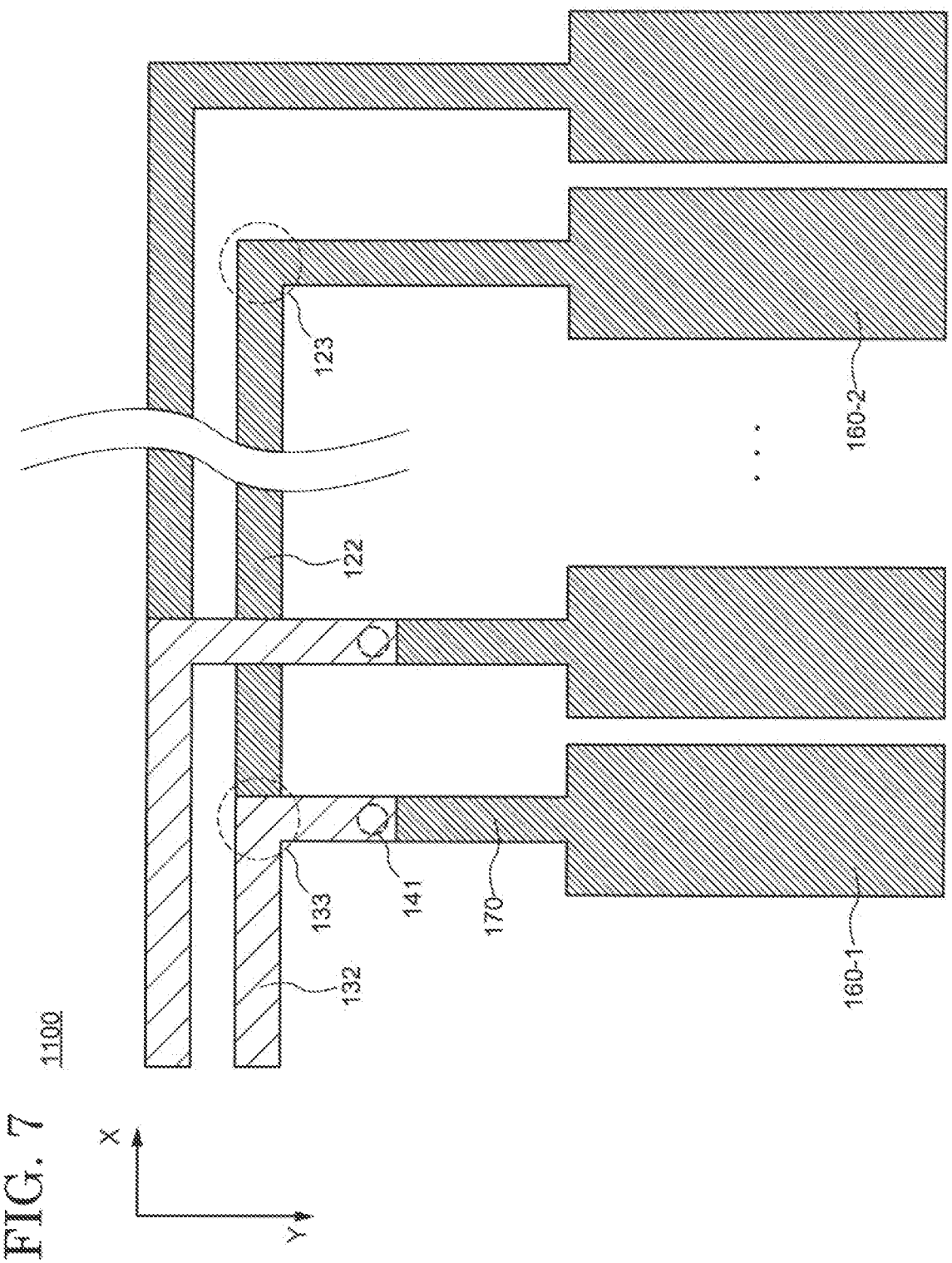
FIG. 7 is a schematic plan view showing a configuration of a terminal portion of a sensor of a detection device according to an embodiment of the present invention.

The shield layer wiring 122 shown in FIG. 7 is a wiring provided in the shield layer 1020 and extends from the shield electrode connection wiring 121 in the sensor portion 1000. Therefore, the shield layer wiring 122 is formed in the same layer as the shield electrode 120, the shield electrode connection wiring 121, the first terminal 160-1, and the second terminal 160-2. Similarly, the sensor layer wiring 132 is a wiring provided in the sensor layer 1030 and extends from the sensor electrode connection wiring 131 in the sensor portion 1000. The sensor layer wiring 132 is formed in the same layer as the sensor electrode 130 and the sensor electrode connection wiring 131.

The sensor layer wiring 132 overlaps the shield layer wiring 122 from the sensor portion 1000 to a region 133. In other words, the planar pattern of the sensor layer wiring 132 matches the planar pattern of the shield layer wiring 122 from the sensor portion 1000 to the region 133. That is, in a plan view, an area in which the sensor layer 1020 is provided so as to match the planar pattern of the shield layer 1030 includes the sensor electrodes 130, the sensor electrode connection wirings 131, and a part of the sensor layer wirings 132 from an area connected to the sensor electrode connection wirings 131 to the region 133. At the region 133, the extending direction of the sensor layer wiring 132 changes from the X direction to the Y direction. The sensor layer wiring 132 extending in the Y direction is connected to a wiring 170 formed in the same layer as the shield layer wiring 122 through an opening (through hole) 141 of the first insulating film 140, and is connected to the first terminal 160-1 via the wiring 170 (see FIG. 5). On the other hand, at a region 123 different from the region 133, the extending direction of the shield layer wiring 122 changes from the X direction to the Y direction. The shield layer wiring 122 extending in the Y direction is directly connected to the second terminal 160-2. That is, the first terminal 160-1 is connected to the sensor electrode 130 and outputs the first detection signal Vdet-1. Similarly, the second terminal 160-2 is connected to the shield electrode 120 and outputs the second detection signal Vdet-2.

The shield electrode 120, the shield electrode connection wiring 121, the shield layer wiring 122, the sensor electrode 130, the sensor electrode connection wiring 131, the sensor layer wiring 132, the wiring 170, the first terminal 160-1, and the second terminal 160-2 are preferably formed with the same material and the same film thickness. In such a configuration, resistance variations in the sensor portion 1000 and the terminal portion 1100 can be reduced. For example, a transparent conductive oxide film (transparent conductive film) such as indium tin oxide (ITO) or indium zinc oxide (IZO), a metal film such as aluminum (Al), or a stacked film thereof can be used for each of the shield electrode 120, the shield electrode connection wiring 121, the shield layer wiring 122, the sensor electrode 130, the sensor electrode connection wiring 131, the sensor layer wiring 132, the first terminal 160-1, and the second terminal 160-2. When a metal film is used for the shield electrode 120 and the sensor electrode 130, the shield electrode 120 and sensor electrode 130 are preferably formed in a mesh shape so that the sensor portion 1000 has translucency. Of course, a two-layer structure in which a metal film in a mesh shape overlaps a transparent conductive film can also be adopted for the sensor electrode 130 or the sensor electrode connection wiring 131. Due to the need to have the same resistance, an upper conductive layer forming the sensor electrode 130 or the sensor electrode connection wiring 131 and a lower conductive layer forming the shield electrode 120 or the shield electrode connection wiring 121 are preferably formed with the same material and/or the same structure. However, different materials and/or structures may also be adopted for the upper conductive layer and the lower conductive layer.

When the metal film in a mesh shape is used as the upper conductive layer, a blackening layer may be provided on the sensor electrode 130 to prevent external light from reflecting on the metal film. In this case, a blackened layer may also be provided on the lower conductive layer. When the blackening layer is provided, the blackening layer has the same planar pattern as the sensor electrode 130 or the shield electrode 120.

The first insulating film 140 separates the shield electrode 120 and the shield electrode connection wiring 121 from the sensor electrode 130 and the sensor electrode connection wiring 131, and flattens the irregularities of the shield electrode 120 and the shield electrode connection wiring 121. For example, an inorganic insulating film such as silicon oxide ($SiO_x$) or silicon nitride ($SiN_x$), or an organic insulating film such as acrylic resin or polyimide resin can be used for the first insulating film 140. When increasing the distance between the shield electrode 120 and the sensor electrode 130, it is preferable to use the organic insulating film as the first insulating film 140. Note that a stacked film of the inorganic insulating film and the organic insulating film can also be used as the first insulating film 140.

The second insulating film 150 protects the sensor electrodes 130 and the sensor electrode connection wirings 131. The inorganic insulating film, the organic insulating film, or the stacked film thereof can be used as the second insulating film 150.

As described above, in the detection device 10 according to the present embodiment, in the sensor portion 1000, the sensor electrodes 130 and the sensor electrode connection wirings 131 have the same planar patterns as the shield electrodes 120 and the shield electrode connection wirings 121, respectively, and overlap so that the planar patterns match each other. In addition, in the terminal portion 1100, the sensor layer wiring 132 has the same planar pattern as the shield layer wiring 122, and includes the area where the planar patterns overlap each other. Therefore, in the detection device 10, the parasitic capacitance in the sensor 100 is reduced, so that the in-plane variation of the baseline can be suppressed. Therefore, in the detecting device 10, the positional accuracy of the object to be detected is improved.

<Modification 1>

Another configuration of the detection device 10 according to an embodiment of the present invention is described with reference to FIG. 8.

Figure 8:
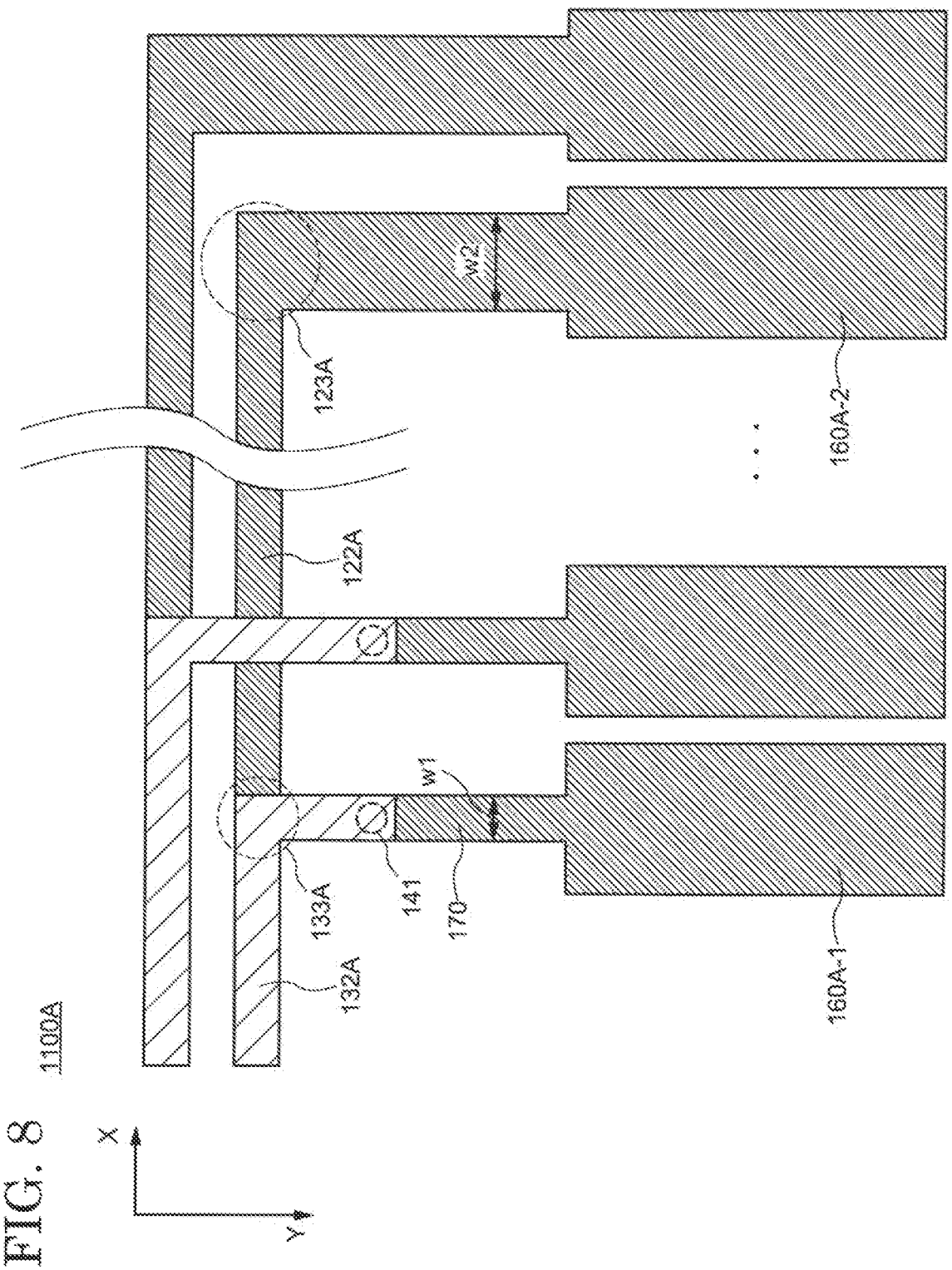
FIG. 8 is a schematic plan view showing a configuration of a terminal portion of a sensor of a detection device according to an embodiment of the present invention.

FIG. 8 is a schematic plan view showing a configuration of a terminal portion 1100A of the sensor 100 of the detection device 10 according to an embodiment of the present invention. When the configuration of the terminal portion 1100A is the same as that of the terminal portion 1100, the description of the configuration of the terminal portion 1100A may be omitted.

A sensor layer wiring 132A overlaps a shield layer wiring 122A from the sensor portion 1000 to a region 133A. In other words, the planar pattern of the sensor layer wiring 132A matches the planar pattern of the shield layer wiring 122A from the sensor portion 1000 to the region 133A. However, in the region 133A, the extending direction of the sensor layer wiring 132A changes from the X direction to the Y direction. The sensor layer wiring 132A extending in the Y direction is connected to a wiring 170A formed in the same layer as the shield layer wiring 122A through the opening 141 of the first insulating film 140, and is connected to a terminal 160A-1 via the wiring 170A. On the other hand, in a region 123A different from the region 133A, the extending direction of the shield layer wiring 122A changes from the X direction to the Y direction. The shield layer wiring 122A extending in the Y direction is directly connected to a second terminal 160A-2.

The wiring length from the region 133A to the first terminal 160A-1 is different from the wiring length from the region 133A to the second terminal 160A-2. Therefore, even if the sensor electrode 130 and the sensor electrode connection wiring 131 overlap the shield electrode 120 and the shield electrode connection wiring 121, respectively, so that the planar patterns match each other, the difference in resistance due to the difference in the wiring length may cause slight in-plane variations in the first detection signal Vdet-1 output from the first terminal 160A-1.

In this case, at least one of the width w1 of the wiring 170A connected to the first terminal 160A-1 and the width w2 of the wiring (a part of the shield layer wiring 122A) connected to the second terminal 160A-2 can be changed to adjust the wiring resistance. For example, the width w2 is different from the width of the sensor layer wiring 132A to adjust the wiring resistance. Thus, even if the wiring lengths are slightly different, the wiring resistance can be adjusted to be substantially the same.

<Modification 2>

Another configuration of the detection device 10 according to an embodiment of the present invention is described with reference to FIG. 9.

Figure 9:
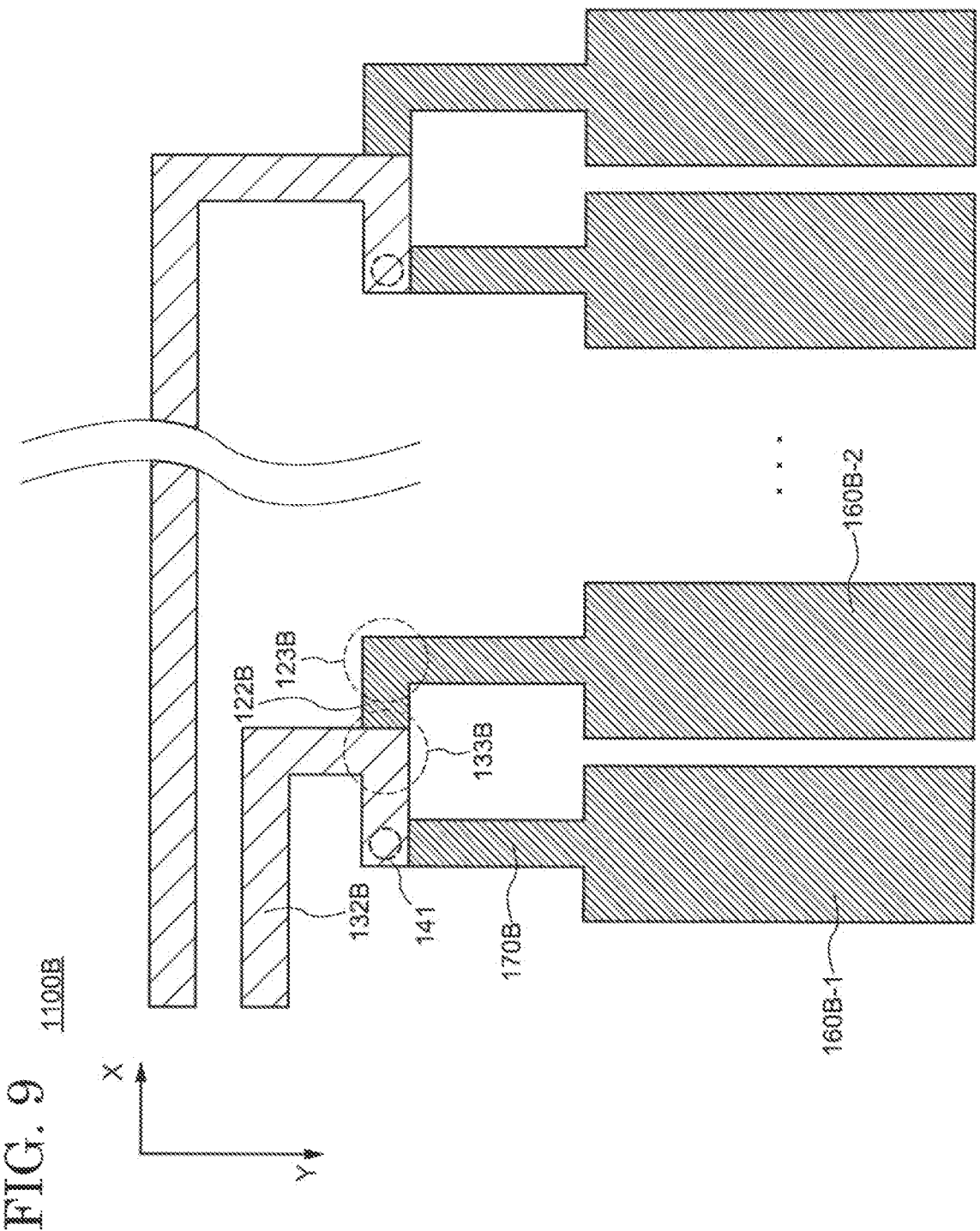
FIG. 9 is a schematic plan view showing a configuration of a terminal portion of a sensor of a detection device according to an embodiment of the present invention.

FIG. 9 is a schematic plan view showing a configuration of a terminal portion 1100B of the sensor 100 of the detection device 10 according to an embodiment of the present invention. When the configuration of the terminal portion 1100B is the same as that of the terminal portion 1100, the description of the configuration of the terminal portion 11006 may be omitted.

A sensor layer wiring 1326 overlaps the shield layer wiring 122B from the sensor portion 1000 to a region 133B. In other words, the planar pattern of the sensor layer wiring 132B matches the planar pattern of the shield layer wiring 122B from the sensor portion 1000 to the region 133B. However, in the region 133B, the extending direction of the sensor layer wiring 132B changes from the Y direction to the −X direction. The sensor layer wiring 132B extending in the −X direction is connected to a wiring 170B formed in the same layer as the shield wiring 122B through the opening 141 of the first insulating film 140, and is connected to a terminal 160B-1 via the wiring 170B. On the other hand, in a region 133B, the extending direction of the shield layer wiring 122B changes from the Y direction to the +X direction. The shield layer wiring 122B extending in the +X direction changes its extending direction from the +X direction to the Y direction in the region 123B and is directly connected to a second terminal 160B-2.

The region 133B is a region where the shield layer wiring 122B branches from the sensor layer wiring 132B that overlaps the shield layer wiring 122B, and is located on the center line between the first terminal 160B-1 and the second terminal 160B-2.

In the terminal portion 1100B, the second terminal 160B-2 is adjacent to the first terminal 160B-1. In other words, in the terminal portion 1100B, the first terminal 160B-1 connected to the sensor electrode 130 and the second terminal 160B-2 connected to the shield electrode 120 overlapping the sensor electrode 130 are alternately arranged.

The wiring resistance from the region 133B to the first terminal 160B-1 is substantially the same as the wiring resistance from the region 1336 to the second terminal 160B-2 except for the resistance of the wiring 170B and the connection resistance. Therefore, in the configuration of the terminal portion 1100B, the parasitic capacitance in the sensor 100 is reduced, so that the in-plane variation of the baseline can be suppressed. Therefore, in the detection device 10 including the terminal portion 1100B according to the Modification 2, the positional accuracy of the object to be detected is further improved.

Second Embodiment

A baseline correction of the detection device 10 according to an embodiment of the present invention is described with reference to FIGS. 10 and 11.

In the detection device 10 described above, the parasitic capacitance in the sensor portion 1000 is reduced. However, it is conceivable that some variations in resistance still remain due to the connection between each terminal and the flexible substrate. In addition, other configurations (e.g., a display module or a frame) provided below the substrate 110 generate a parasitic capacitance between the shield electrode 120 and the other configurations, thus, capacitance variations between the sensor 100 and the other configurations may occur. These variations in resistance and parasitic capacitance cause in-plane variations in the first detection signal Vdet-1 output from the plurality of sensor electrodes 130.

In the detection device 10, not only the first detection signal Vdet-1 output from the plurality of sensor electrodes 130 but also the second detection signal Vdet-2 output from the plurality of shield electrodes 120 are connected to the detection signal amplification circuit 210. Therefore, before the detecting device 10 starts to detect the object to be detected, a correction processing for correcting the conditions of the detection signal amplification circuit 210 connected to the shield electrode 120 can be performed.

Figure 10:
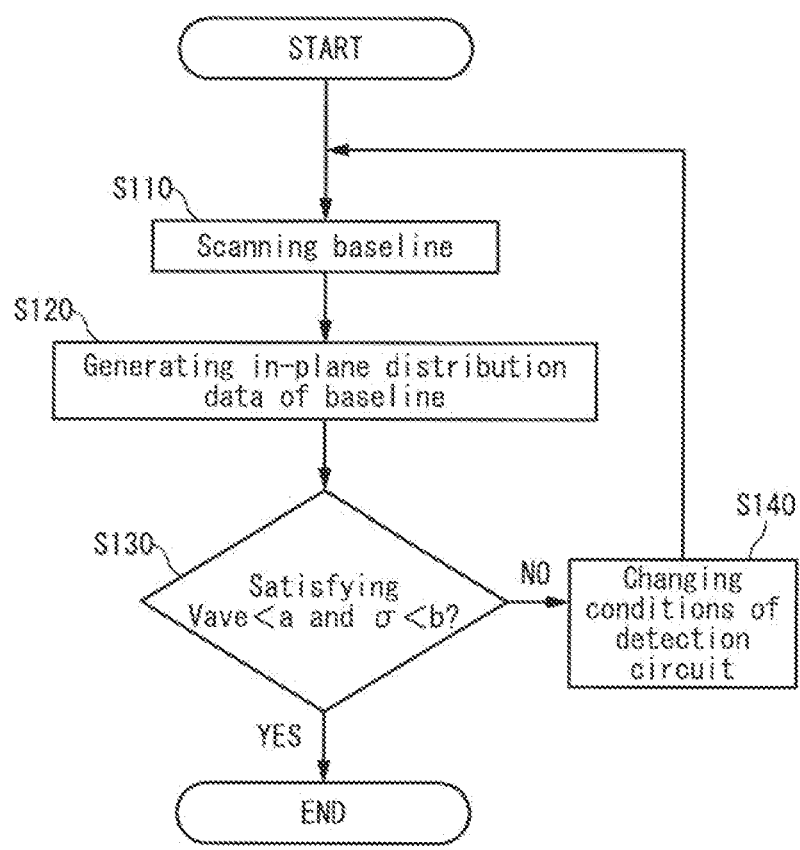
FIG. 10 is a flow chart showing correction processing of a detection device according to an embodiment of the present invention.

FIG. 10 is a flow chart showing correction processing of the detection device 10 according to an embodiment of the present invention. Note that the correction processing is performed in a state where the object to be detected does not exist on the sensor portion 1000.

In step S110, a baseline scan is performed. Specifically, the detection circuit 200 amplifies and digitally converts the first detection signal Vdet-1 output from each of the plurality of sensor electrodes 130 to obtain the first digital output signal Vout-1 corresponding to each of the plurality of sensor electrodes 130. Similarly, the detection circuit 200 amplifies and digitally converts the second detection signal Vdet-2 output from each of the plurality of shield electrodes 120 to obtain the second digital output signal Vout-2 corresponding to each of the plurality of shield electrodes 120.

In step S120, baseline in-plane distribution data of a baseline is generated. Specifically, an average value Vave and a standard deviation σ of the plurality of first digital output signals Vout-1 obtained in the step S110 are calculated. The in-plane distribution data of the baseline is, for example, the average value or the standard deviation, but is not limited to this configuration.

In step S130, it is determined whether or not the average value Vave and the standard deviation σ calculated in the step S130 satisfy predetermined conditions. Specifically, it is determined whether or not the average value Vave is smaller than the first threshold value a and whether the standard deviation σ is smaller than the second threshold value b. When the conditions are satisfied (step S130: YES), the correction processing ends. On the other hand, when the condition is not satisfied (step S130: NO), step S140 is performed.

In step S140, the conditions of the detection circuit 200 are changed. Specifically, the timing of the AC rectangular wave VCM input to the non-inverting output terminal of the detection signal amplification circuit 210 to which the second detection signal Vdet-2 output from the shield electrode 120 is input is changed. This is explained with reference to FIG. 11.

Figure 11:
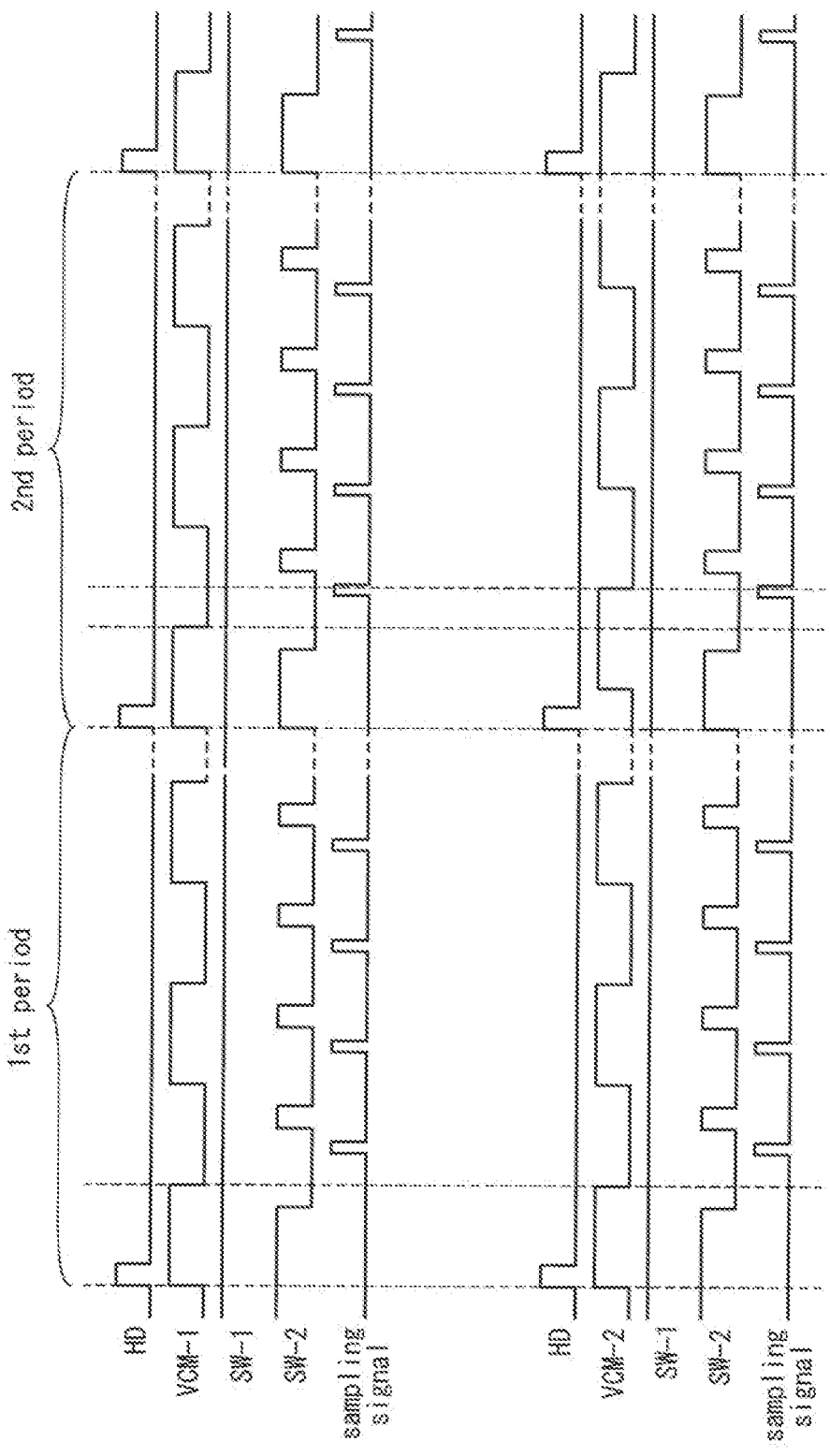
FIG. 11 is a timing chart showing driving of a detection circuit in which correction processing is performed in a detection device according to an embodiment of the present invention.

FIG. 11 is a timing chart showing driving of the detection circuit 200 in which the correction processing is performed in the detection device 10 according to an embodiment of the present invention. Timings of the synchronization signal HD, the first switch SW-1, the second switch SW-2, and the sampling signal are not different between the detection signal amplification circuit 210 connected to the sensor electrode 130 (hereinafter, referred to as "the first detection signal amplification circuit") and the detection signal amplification circuit 210 connected to the shield electrode 120 (hereinafter, referred to as "the second detection signal amplification circuit"). On the other hand, timings of the first AC rectangular wave VCM-1 input to the first detection signal amplification circuit and the second AC rectangular wave VCM-2 input to the second detection signal amplification circuit are adjusted. Specifically, the host computer 300 determines the in-plane variation of the baseline of the first detection signal Vdet-1 or the comparison with the threshold value in a first period, and adjusts the timings so that a phase of the second AC rectangular wave VCM-2 is different from a phase of the first AC rectangular wave VCM-2 based on the determination in a second period. Note that the adjustment of phase timings may be performed based on a lookup table in the host computer 300. This adjustment reduces the potential difference between the sampled first digital output signal Vout-1 and the sampled second digital output signal Vout-2, thus, the variations in phase of the baseline due to the parasitic capacitance are reduced.

After step S140 ends, step S110 is performed again. By repeating the steps S110 to S140, the in-plane variation of the baseline can be reduced.

In the detection device 10 according to the present embodiment, not only the first detection signal Vdet-1 output from the sensor electrode 130 is input to the first detection signal amplification of the detection circuit 200 but also the second detection signal Vdet-2 output from the shield electrode 120 is input to the second detection signal amplification of the detection circuit 200. Therefore, when the correction processing for adjusting the timing of the second AC rectangular wave VCM-2 input to the non-inverting input terminal of the second detection signal amplification circuit is performed, the variation in phase of the baseline caused by the parasitic capacitance can be reduced. Therefore, in the detecting device 10, the positional accuracy of the object to be detected is further improved by performing the correction processing for correcting the conditions of the second detection signal amplification circuit.

Third Embodiment

A configuration of a sensor 100C of the detection device 10 according to an embodiment of the present invention is described with reference to FIG. 12. When the configuration of the sensor 100C is the same as that of the sensor 100, the description of the configuration of the sensor 100C may be omitted.

Figure 12:
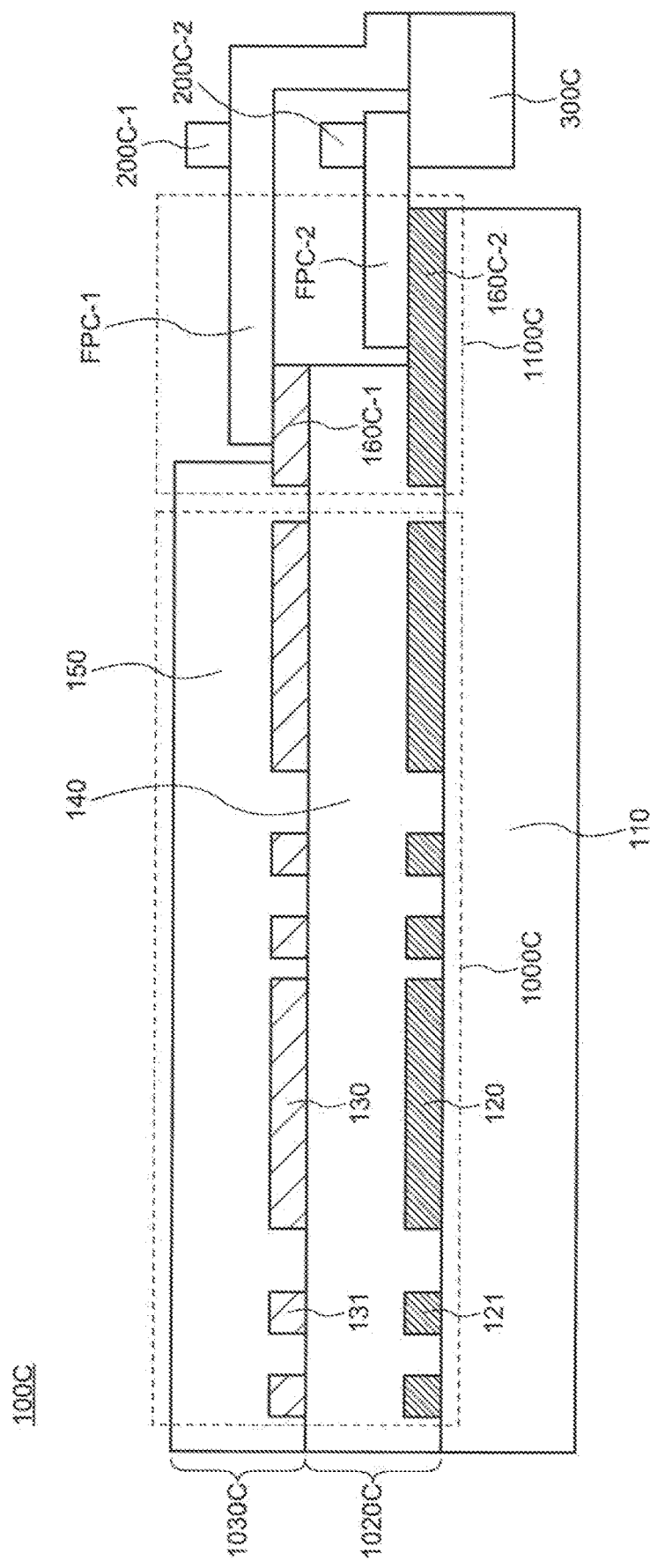
FIG. 12 is a schematic cross-sectional view showing a configuration of a sensor of a detection device according to an embodiment of the present invention.

FIG. 12 is a schematic cross-sectional view showing a configuration of the sensor 100C of the detection device 10 according to an embodiment of the invention. As shown in FIG. 12, the sensor 100C includes the substrate 110, a shield layer 1020C, and a sensor layer 1030C. The shield layer 1020C is provided on the substrate 110. The sensor layer 1030C is provided on the shield layer 1020C.

The shield layer 1020C includes the plurality of shield electrodes 120, the plurality of shield electrode connection wirings 121, the first insulating film 140, and a plurality of second terminals 160C-2. The plurality of shield electrodes 120, the plurality of shield electrode connection wirings 121, and the plurality of second terminals 160C-2 are formed of the same layer and covered with the first insulating film 140. The plurality of shield electrodes 120 and the plurality of shield electrode connection wirings 121 are provided in a sensor portion 1000C, and the plurality of second terminals 160C-2 is provided in a terminal portion 1100C. Since each of the plurality of second terminals 160C-2 is connected to a second flexible printed circuit substrate FPC-2, a part of each of the plurality of second terminals 160C-2 has a region exposed from the first insulating film 140.

The sensor layer 1030C includes the plurality of sensor electrodes 130, the plurality of sensor electrode connection wirings 131, the second insulating film 150, and a plurality of first terminals 160C-1. The plurality of sensor electrodes 130, the plurality of sensor electrode connection wirings 131, and the plurality of first terminals 160C-1 are formed of the same layer and covered with the second insulating film 150. The plurality of sensor electrodes 130 and the plurality of sensor electrode connection wirings 131 are provided in the sensor portion 1000C, and the plurality of first terminals 160C-1 is provided in the terminal portion 1100C. Since each of the plurality of first terminals 160C-1 is connected to a first flexible printed circuit substrate FPC-1, a part of each of the plurality of first terminals 160C-1 has a region exposed from the second insulating film 150.

In the sensor portion 1000C, the plurality of sensor electrodes 130 has the same plane pattern as the plurality of shield electrodes 120. In other words, the planar pattern of each of the plurality of sensor electrodes 130 is the same as the planar pattern of each of the plurality of shield electrodes 120. In a plan view, the planar pattern of the plurality of sensor electrodes 130 matches the planar pattern of the plurality of shield electrodes 120. That is, the plurality of sensor electrodes 130 overlaps the plurality of shield electrodes 120 such that the planar pattern of the plurality of sensor electrodes 130 matches the planar pattern of the plurality of shield electrodes 120.

Further, in the sensor portion 1000C, the plurality of sensor electrode connection wirings 131 has the same planar pattern as the plurality of shield electrode connection wirings 121. Therefore, the plurality of sensor electrode connection wirings 131 overlaps the plurality of shield electrode connection wirings 121 so that the planar pattern of the plurality of sensor electrode connection wirings 131 matches the planar pattern of the plurality of shield electrode connection wirings 121. More specifically, one sensor electrode 130 and one shield electrode 120 overlap each other so that the planar pattern of the one sensor electrode 130 matches the planar pattern of the one shield electrode 120, and the sensor electrode connection wiring 131 connected to the one sensor electrode 130 and the shield electrode connection wiring 121 connected to the one shield electrode 120 overlap each other so that the planar pattern of the sensor electrode connection wiring 131 matches the shield electrode connection wiring 121.

In the terminal portion 1100C, the plurality of second terminals 160C-2 connected to the plurality of shield electrode connection wirings 121 is provided in the shield layer 1020C, and the plurality of first terminals 160C-1 connected to the plurality of sensor electrode connection wirings 131 is provided in the sensor layer 1030C. That is, the first terminal 160C-1 and the second terminal 160C-2 are provided in different layers. Therefore, in the terminal portion 1100C, the sensor layer wiring extending from the sensor electrode connection wiring 131 of the sensor portion 1000C is directly connected to the first terminal 160C-1 without providing an opening in the first insulating film 140. Therefore, in the sensor 100C, the sensor layer wiring can overlap the shield layer wiring so that the planar pattern of the sensor layer wiring matches the planar pattern of the shield layer wiring in the terminal portion 1100C.

A first detection circuit 200C-1 and a second detection circuit 200C-2 are provided on the first flexible printed circuit board FPC-1 and the second flexible printed circuit board FPC-2, respectively. The first detection circuit 200C-1 converts the first detection signal Vdet-1 of the sensor electrode 130 to output the first digital output signal Vout-1. The second detection circuit 200C-2 converts the second detection signal Vdet-2 of the shield electrode 120 to output the second digital output signal Vout-2. The first flexible printed circuit substrate FPC-1 and the second flexible printed circuit substrate FPC-2 are connected to one host computer 300C, and the first digital output signal Vout-1 and the second digital output signal Vout-2 are input to this host computer 300C.

Although FIG. 12 shows that the first detection circuit 200C-1 and the second detection circuit 200C-2 are provided separately, and the first detection circuit 200C-1 and the second detection circuit 200C-2 are connected to one host computer 300, the first detection circuit 200C-1 and the second detection circuit 200C-2 may be integrated into the host computer 300C.

As described above, in the sensor 100C of the detection device 10 according to the present embodiment, in the sensor portion 1000C, the plurality of sensor electrodes 130 and the plurality of sensor electrode connection wirings 131 have the same planar patterns as the plurality of shield electrodes 120 and the plurality of shield electrodes 120, respectively, and overlap so that the planar patterns match each other. In addition, in the terminal portion 1100C, the sensor layer wiring and the shield layer wiring have the same planar patterns, respectively, and overlap so that the planar patterns match each other. Therefore, in the sensor 100C, the parasitic capacitance in the sensor 100C is reduced, so that the in-plane variation of the baseline can be suppressed. Therefore, in the detection device 10 including the sensor 100C, the positional accuracy of the object to be detected is improved.

Fourth Embodiment

A configuration of a sensor 100D of the detection device 10 according to an embodiment of the present invention is described with reference to FIG. 13. When the configuration of the sensor 100D is the same as the configuration of the sensor 100, the description of the configuration of the sensor 100D may be omitted.

Figure 13:
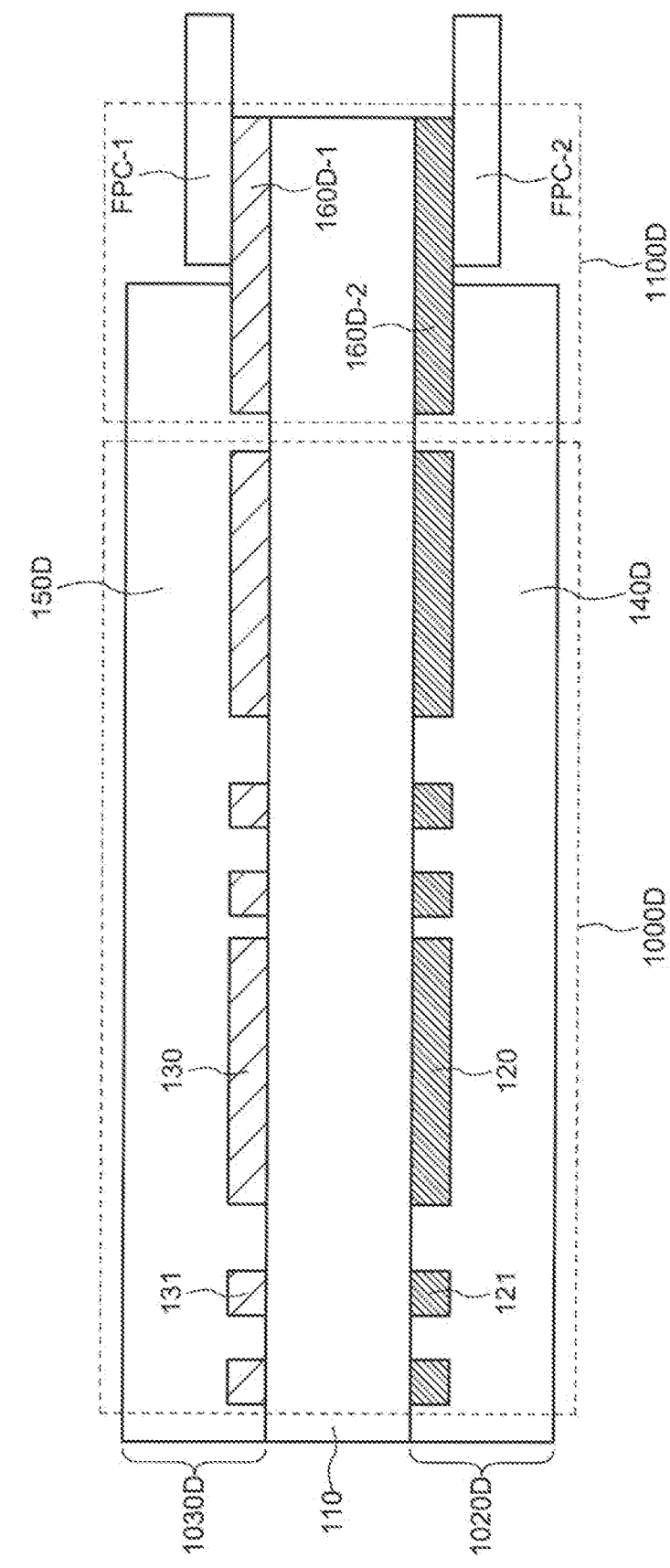
FIG. 13 is a schematic cross-sectional view showing a configuration structure of a sensor of a detection device according to one embodiment of the present invention.

FIG. 13 is a schematic cross-sectional view showing a configuration of the sensor 100D of the detection device 10 according to an embodiment of the present invention. As shown in FIG. 13, the sensor 100D includes the substrate 110, a shield layer 1020D, and a sensor layer 1030D. The shield layer 1020D is provided on one surface of the substrate 110. The sensor layer 1030D is provided on the other surface of the substrate 110.

The shield layer 1020D includes the plurality of shield electrodes 120, the plurality of shield electrode connection wirings 121, a first insulating film 140D, and a plurality of second terminals 160D-2. The plurality of shield electrodes 120, the plurality of shield electrode connection wirings 121, and the plurality of second terminals 160D-2 are formed of the same layer and covered with the first insulating film 140D. The plurality of shield electrodes 120 and the plurality of shield electrode connection wirings 121 are provided in a sensor portion 1000D, and the plurality of second terminals 160D-2 are provided in a terminal portion 1100D. Since each of the plurality of second terminals 160D-2 is connected to the second flexible printed circuit substrate FPC-2, a part of each of the plurality of second terminals 160D-2 has a region exposed from the first insulating film 140D.

The sensor layer 1030D includes the plurality of sensor electrodes 130, the plurality of sensor electrode connection wirings 131, a second insulating film 150D, and a plurality of first terminals 160D-1. The plurality of sensor electrodes 130, the plurality of sensor electrode connection wirings 131, and the plurality of first terminals 160D-1 are formed of the same layer and covered with the second insulating film 150D. The plurality of sensor electrodes 130 and the plurality of sensor electrode connection wirings 131 are provided in the sensor portion 1000D, and the plurality of first terminals 160D-1 are provided in the terminal portion 1100D. Since each of the plurality of first terminals 160D-1 is connected to the first flexible printed circuit substrate FPC-1, a part of each of the plurality of first terminals 160D-1 has a region exposed from the second insulating film 150D.

In the sensor portion 1000D, the plurality of sensor electrodes 130 has the same planar pattern as the plurality of shield electrodes 120. In other words, the planar pattern of each of the plurality of sensor electrodes 130 is the same as the planar pattern of each of the plurality of shield electrodes 120. In a plan view, the planar pattern of the plurality of sensor electrodes 130 matches the planar pattern of the plurality of shield electrodes 120. That is, the plurality of sensor electrodes 130 overlaps the plurality of shield electrodes 120 such that the planar pattern of the plurality of sensor electrodes 130 matches the planar pattern of the plurality of shield electrodes 120.

Further, in the sensor portion 1000D, the plurality of sensor electrode connection wirings 131 has the same planar pattern as the plurality of shield electrode connection wirings 121. Therefore, the plurality of sensor electrode connection wirings 131 overlaps the plurality of shield electrode connection wirings 121 so that the planar pattern of the plurality of sensor electrode connection wirings 131 matches the planar pattern of the plurality of shield electrode connection wirings 121. More specifically, one sensor electrode 130 and one shield electrode 120 overlap each other so that the planar pattern of the one sensor electrode 130 matches the planar pattern of the one shield electrode 120, and the sensor electrode connection wiring 131 connected to the one sensor electrode 130 and the shield electrode connection wiring 121 connected to the one shield electrode 120 overlap each other so that the planar pattern of the sensor electrode connection wiring 131 matches the planar pattern of the shield electrode connection wiring 121.

In the terminal portion 1100D, the plurality of second terminals 160D-2 connected to the plurality of shield electrode connection wirings 121 are provided in the shield layer 1020D, and the plurality of first terminals 160D-1 connected to the plurality of sensor electrode connection wirings 131 are provided in the sensor layer 1030D. That is, the first terminal 160D-1 and the second terminal 160D-2 are provided in different layers. Therefore, in the terminal portion 1100D, the sensor layer wiring extending from the sensor electrode connection wiring 131 is directly connected to the first terminal 160D-1 without an opening in the first insulating film 140D or the second insulating film 150D. Further, the shield layer wiring extending from the shield electrode connection wiring 121 is directly connected to the second terminal 160D-2 without providing an opening in the first insulating film 140D or the second insulating film 150D. Therefore, in the sensor 100D, the sensor layer wirings overlap the shield layer wirings so that the planar pattern of the sensor layer wirings matches the planar pattern of the shield layer wirings in the terminal portion 1100D. This means that the pattern of the sensor layer entirely match up the pattern of the shield layer in a plan view.

As described above, in the sensor 100D of the detection device 10 according to the present embodiment, in the sensor portion 1000D, the plurality of sensor electrodes 130 and the plurality of sensor electrode connection wirings 131 have the same planar patterns as the plurality of shield electrodes 120 and the plurality of shield electrodes 120, respectively, and overlap so that the planar patterns match each other. In addition, in the terminal portion 1100C, the sensor layer wiring and the shield layer wiring have the same planar patterns, respectively, and overlap so that the planar patterns match each other. Therefore, in the sensor 100D, the parasitic capacitance in the sensor 100D is reduced, so that the in-plane variation of the baseline can be suppressed. Therefore, in the detection device 10 including the sensor 100C, the positional accuracy of the object to be detected is improved.

Fifth Embodiment

A configuration of a display device 50 including the detection device 10 according to an embodiment of the present invention is described with reference to FIGS. 14 and 15. Further, in the following description, the description of the configuration of the detection device 10 may be omitted.

Figure 14:
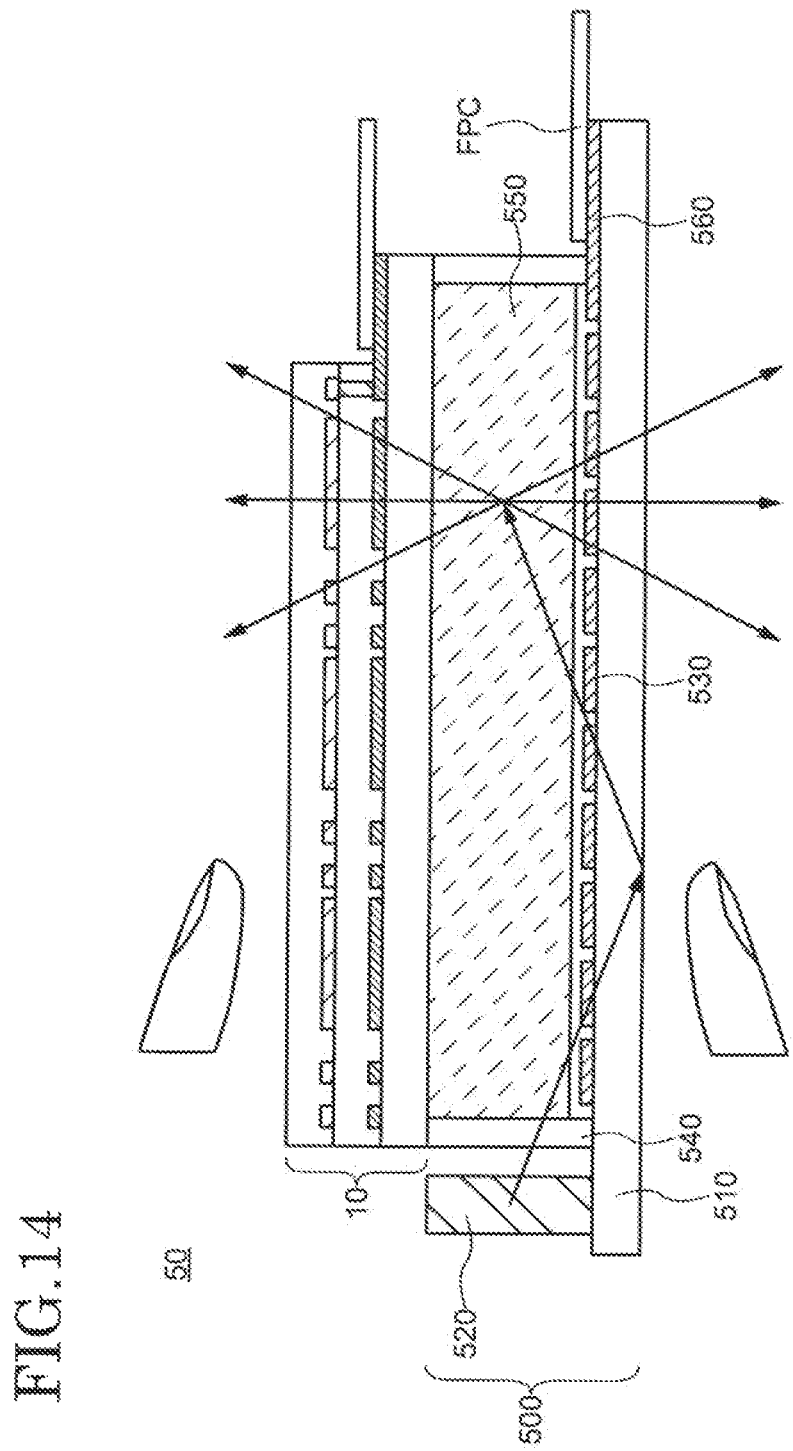
FIG. 14 is a schematic cross-sectional view showing a configuration of a display device according to an embodiment of the present invention.

FIG. 14 is a schematic cross-sectional view showing a configuration of a display device 50 according to an embodiment of the present invention. As shown in FIG. 14, the display device 50 includes a display module 500 and the detection device 10. The detection device 10 is provided on the display module 500. The display module 500 has translucency. In the display device 50, not only a surface side on the detection device 10 but also a surface side on the display module 500 serves as a display surface. Therefore, in the display device 50, not only the surface side on the detection device 10 but also the surface side on the display module 500 serves as the detection surface of the detection device 10. That is, the display device 50 is a transparent display device capable of double-sided detection.

A display module using liquid crystals is described below as an example of the display module 500.

The display module 500 includes a substrate 510, a light source 520, a pixel 530, a sealing material 540, a liquid crystal 550, and a terminal 560. The light source 520 is provided on an edge of the substrate 510. The liquid crystal 550 is enclosed in a space surrounded by the substrate 510 and the sealing material 540. The pixel 530 for driving the liquid crystal 550 is provided on the substrate 510. The pixel 530 includes, for example, a transistor and electrodes. The transistor of the pixel 530 is controlled and the liquid crystal 550 is driven by the electric field generated between the electrodes. A control signal for the pixel 530 is input through the flexible printed circuit substrate FPC connected to the terminal 560.

The light from the light source 520 is irradiated to the substrate 510 and enters the liquid crystal 550. By controlling the pixel 530, the light can be scattered by the liquid crystal 550 on the controlled pixel 530. The scattered light is emitted from the surface side on the detection device 10 and the surface side on the substrate 510, and is viewed by an observer as a display image on each surface.

The display module 500 can be driven in a field sequential method, for example. In the field sequential method, one frame period includes a plurality of subframe periods (fields). For example, when the light source 520 includes red, green, and blue light emitting elements, one frame period includes the subframe periods for red, green, and blue colors.

In the red subframe period, the red light emitting element is illuminated and the red pixel corresponding to the image data is controlled. Thus, a red image is displayed in the red subframe period. Similarly, in the green and blue subframe periods, the green and blue light emitting elements are illuminated, respectively, and the green and blue pixels corresponding to the image data are controlled. Thus, green and blue images are displayed in the green and blue subframe periods, respectively. The red, green, and blue images displayed in a time-division manner in this method are combined with each other and viewed by the observer as a full-color display image.

Note that the display module 500 is not limited to the display module using the liquid crystal described above. For example, the display module 500 may be transparent and may be a display module using an OELD or a micro LED.

FIG. 15 is a timing chart showing driving of the detection circuit 200 that performs double-sided detection in the display device 50 according to an embodiment of the present invention. Timings of the synchronization signal HD, the AC rectangular wave VCM, the first switch SW-1, and the second switch SW-2 are no different between the first detection signal amplification circuit connected to the sensor electrode 130 and the second detection signal amplification circuit connected to the shield electrode 120. On the other hand, a first sampling signal for outputting the first digital output signal Vout-1 and a second sampling signal for outputting the second digital output signal Vout-2 are alternately input to the first detection signal amplification circuit and the second detection signal amplification circuit. When the first sampling signal is input, the surface side on the detection device 10 becomes the detection surface, and the object to be detected in contact or in proximity on the surface side on the detection device 10 can be detected. On the other hand, when the second sampling signal is input, the functions of shield electrode 120 and sensor electrode 130 are reversed. Therefore, the surface side on the display module 500 becomes the detection surface, and the object to be detected in contact or in proximity on the surface side on the display module 500 can be detected. In the detection device 10, since each of the sensor electrode 130 and the shield electrode 120 is connected to the detection signal amplification circuit 210, both sides can be detected simply by changing the setting of the detection timing control circuit 240.

Further, in the detection device 10 included in the display device 50, the blackened layer may be provided over the sensor electrode 130 and below the shield electrode 120 to prevent external light from reflecting on the sensor electrode 130 and shield electrode 120.

As described above, the display device 50 according to the present embodiment includes the detection device 10 in which each of the sensor electrode 130 and the shield electrode 120 is connected to the detection circuit 200. The first digital output signal Vout-1 is output from the detection circuit 200 including the first detection signal amplification circuit to which the sensor electrode 130 is connected, and the second digital output signal Vout-2 is output from the detection circuit 200 including the second detection signal amplification circuit to which the shield electrode 120 is connected. Therefore, by calculating the position of the object to be detected using the first digital output signal Vout-1 and the second digital output signal Vout-2, the detected object can be detected on both sides of the display device 50.

Each of the embodiments described above as an embodiment of the present invention can be appropriately combined and implemented as long as they do not contradict each other. Additions, deletion, or design changes of constituent elements, or additions, omissions, or changes to conditions of steps as appropriate based on the respective embodiments are also included within the scope of the present invention as long as the gist of the present invention is provided.

Other effects which differ from those brought about by each of the embodiments described above, but which are apparent from the description herein or which can be readily predicted by those skilled in the art, are naturally understood to be brought about by the present invention.

What is claimed is:

1. A detection device comprising:
   a shield layer provided with a shield electrode and a shield electrode connection wiring connected to the shield electrode;
   a sensor layer located over the shield layer and provided with a sensor electrode and a sensor electrode connection wiring connected to the sensor electrode; and
   a terminal portion connected to a detection circuit and provided with a first terminal and a second terminal,
   wherein the shield electrode has a same planar pattern as the sensor electrode and overlaps the sensor electrode,
   the shield electrode connection wiring has a same planar pattern as the sensor electrode connection wiring and overlaps the sensor electrode connection wiring,
   the first terminal and the second terminal are provided in the shield layer,
   the detection circuit comprises:
     a first detection signal amplifier circuit to which a first detection signal and a first AC rectangular wave output from the first terminal are input, and
     a second detection signal amplifier circuit to which a second detection signal and a second AC rectangular wave output from the second terminal are input, and
     a phase of the second AC rectangular wave is different from a phase of the first AC rectangular wave.

2. The detection device according to claim 1,
   wherein a first wiring connected to the first terminal through an opening is a wiring extending from the sensor electrode connection wiring of the sensor layer, and
   a second wiring directly connected to the second terminal is a wiring extending from the shield electrode connection wiring of the shield layer.

3. The detection device according to claim 2, wherein the second wiring is directly connected to the second terminal with a width different from a width of the first wiring.

4. The detection device according to claim 2, wherein the first terminal is adjacent to the second terminal.

5. A detection device comprising:
   a shield layer provided with a shield electrode and a shield electrode connection wiring connected to the shield electrode;
   a sensor layer located over the shield layer and provided with a sensor electrode and a sensor electrode connection wiring connected to the sensor electrode; and
   a terminal portion connected to a detection circuit and provided with a first terminal and a second terminal,
   wherein the shield electrode has a same planar pattern as the sensor electrode and overlaps the sensor electrode,
   the shield electrode connection wiring has a same planar pattern as the sensor electrode connection wiring and overlaps the sensor electrode connection wiring,
   the first terminal is provided in the sensor layer,
   the second terminal is provided in the shield layer,
   the detection circuit comprises:
     a first detection signal amplifier circuit to which a first detection signal and a first AC rectangular wave output from the first terminal are input, and
     a second detection signal amplifier circuit to which a second detection signal and a second AC rectangular wave output from the second terminal are input, and
     a phase of the second AC rectangular wave is different from a phase of the first AC rectangular wave.

* * * * *